United States Patent [19]
Seidl

[11] Patent Number: 5,583,977
[45] Date of Patent: Dec. 10, 1996

[54] OBJECT-ORIENTED CURVE MANIPULATION SYSTEM

[75] Inventor: Robert Seidl, Palo Alto, Calif.

[73] Assignee: Taligent, Inc., Cupertino, Calif.

[21] Appl. No.: 139,951

[22] Filed: Oct. 21, 1993

[51] Int. Cl.$^6$ ............................................. G06F 15/00
[52] U.S. Cl. ................................................. 395/133
[58] Field of Search ........................... 395/133, 136, 395/137, 138, 139; 345/126, 127

[56] References Cited

U.S. PATENT DOCUMENTS

| | | | |
|---|---|---|---|
| 3,658,427 | 4/1972 | DeCou | 356/156 |
| 3,881,605 | 5/1975 | Grossman | 214/1 CM |
| 4,082,188 | 4/1978 | Grimmell et al. | 209/73 |
| 4,821,220 | 4/1989 | Duisberg | 364/578 |
| 4,885,717 | 12/1989 | Beck et al. | 364/900 |
| 4,891,630 | 1/1990 | Friedman et al. | 340/706 |
| 4,953,080 | 8/1990 | Dysart et al. | 364/200 |
| 5,041,992 | 8/1991 | Cunningham et al. | 364/518 |
| 5,050,090 | 9/1991 | Golub et al. | 364/478 |
| 5,060,276 | 10/1991 | Morris et al. | 382/8 |
| 5,075,848 | 12/1991 | Lai et al. | 395/425 |
| 5,093,914 | 3/1992 | Coplien et al. | 395/700 |
| 5,119,475 | 6/1992 | Smith et al. | 395/156 |
| 5,125,091 | 6/1992 | Staas, Jr. et al. | 395/650 |
| 5,133,075 | 7/1992 | Risch | 395/800 |
| 5,136,705 | 8/1992 | Stubbs et al. | 395/575 |
| 5,151,987 | 9/1992 | Abraham et al. | 395/575 |
| 5,181,162 | 1/1993 | Smith et al. | 364/419 |
| 5,307,453 | 4/1994 | Takashiro | 395/133 |
| 5,491,779 | 2/1996 | Bezjian | 395/140 |

FOREIGN PATENT DOCUMENTS

| | | |
|---|---|---|
| 2077173 | 5/1993 | Canada . |
| 2239773 | 7/1991 | United Kingdom . |

OTHER PUBLICATIONS

Computer Aided Design, V.21(8), Oct. 1989, London, GB, pp. 509–518, L. Piegl "Modifying the Shape of Rational B–Splines. Part 1: Curves".

*Primary Examiner*—Phu K. Nguyen
*Attorney, Agent, or Firm*—Keith Stephens; Bookstein & Kudirka

[57] ABSTRACT

A method and apparatus enables direct manipulation of 3D curve images on a computer display. In accordance with this method and apparatus, a curve object is created which, in turn, generates a 3D virtual box image enclosing a portion of a selected curve image. The 3D virtual box image has areas which are sensitive to a pointing device cursor such that a user can select an area and use it to manipulate the virtual box. Manipulation of the virtual box causes the curve object to redisplay the portion of the curve image within the box so that the curve image is changed with direct kinesthetic correspondence between the manipulation of the virtual box and the curve image.

53 Claims, 25 Drawing Sheets

OBJECT-ORIENTED CURVE MANIPULATION SYSTEM

FIELD OF THE INVENTION

The present invention relates to the field of manipulation of 3D objects on computer displays. More specifically, the present invention relates to the field of manipulation of a 3D curve object displayed on a computer display with kinesthetic feedback to the user directing the manipulation.

BACKGROUND OF THE INVENTION

Many prior art computer systems include computer controlled display systems which utilize bit-mapped displays which typically present a graphic image to the user of the computer system. In these computer controlled display systems, a bit-mapped image appears on a display means, such as a cathode ray tube (CRT) or liquid crystal display (LCD); the bit-mapped image is typically generated and stored in a frame buffer which acts as a memory for the display system. In these display systems, the user typically interacts with the computer system by manipulating a cursor control means, such as a mouse. The user uses the mouse to position a cursor on the bit-mapped image to select options which are displayed under the control of the computer system on the display means.

Advances in computer graphics have extended the range of capabilities for the user. Objects can now be displayed in three-dimensional (3D) representation, for example in wireframe, solid and/or shaded forms. While a 3D trackball input controller device has been utilized for manipulating objects displayed in 3D representation, it is complex and expensive. Various techniques utilizing two-dimensional (2D) input controllers such as a mouse have been developed for manipulating objects displayed in 3D representation. A known technique utilizes graphically displayed X, Y, and Z sliders which are adjusted by the user (for example, with an input controller stick as a mouse) to indicate the amount of rotation about each axis independently. Typically, only one slider is adjusted at any given time. Another known technique involves the menu selection of the axis about which rotation is desired. An input controller such as a mouse is then moved in one dimension to indicate the amount of rotation. Still another technique involves holding down one of three buttons on a mouse or a keyboard to select the axis of rotation, and then moving a mouse in one dimension to indicate the amount of rotation. A still further technique involves selecting the object by clicking on it with the mouse pointer and again using the mouse pointer to drag a handle on the selected object in order to move, re-shape, re-size, or rotate the object. Oftentimes, with 3D objects, only one or two dimensions can be altered with any given handle and rotation only occurs around a central point in a world 3D space as opposed to rotation around the centerpoint (or other axis) of the 3D object itself (sometimes referred to as model space). An even further technique involves selecting a 3D object by clicking on it with the mouse pointer, using the mouse pointer to make a menu selection as to a predefined type of movement option desired and again using the mouse pointer to drag a handle on the selected object in order to define a movement of the selected predefined type of movement. Typically, with 3D objects, only one predefined type of movement is available at a time in what is commonly known as a modal form of operation.

An important consideration with known techniques for manipulating displayed objects represented in 3D form is the lack of kinesthetic correspondence (or stimulus-response compatibility) between the movement of the input controller device and the object movement or direction of object rotation. That is, the required movement of the input controller device does not provide the sense of directly manipulating the displayed object. Stated differently, known techniques for manipulating displayed objects represented in 3D form typically lack direct manipulation kinesthetic correspondence whereby the 3D displayed object being manipulated continuously moves (is continuously re-displayed) with the mouse controlled pointer directing the manipulation so that the pointer may remain on the same location of the displayed 3D object throughout the manipulation. Another consideration with known techniques is the inability to provide rotation about an arbitrary axis that includes X, Y, and Z components. A still further consideration is the inherent limitation of the modal form of 3D object manipulation which further separates the user's expectations regarding moving a real world 3D object from the experience of moving an image of the 3D object on a computer display due to having to either select between alternative manipulation modes and/or operate in different windows each containing different views of the object to be manipulated.

SUMMARY OF THE INVENTION

An objective of the present invention is to provide an improved technique for manipulating curve objects displayed in 3D representation with 2D input controller devices which provides for kinesthetic correspondence between input controller motion and displayed curve object movement. Another objective of the present invention is to provide an improved technique for intuitively manipulating displayed 3D curve objects such that the displayed 3D curve object manipulation emulates physical 3D curve object manipulation. A still further objective of the present invention is to provide an improved technique for manipulation of displayed 3D curve objects which provides for de-coupled curve object rotation, both homogenous and non-homogenous curve object scaling and both translate-slide and translate-pull curve object translation.

The foregoing and other advantages are provided by a method for manipulating a curve object displayed in three-dimensional representation on a computer controlled display system having a computer and a display coupled to the computer, the method comprising the steps of providing a user actuated input controller for selectively positioning a cursor on the display, positioning the cursor over the displayed curve object and signaling the computer to activate a control movement mode, providing a three-dimensional representation of a virtual box enclosing the displayed curve object, positioning the cursor over a portion of the virtual box sensitive to the presence of the cursor, signaling the computer to activate a predefined control movement type specified by the sensitive portion of the virtual box under the cursor and repositioning the cursor to define a movement of the predefined control movement type, and re-displaying the displayed curve object in accordance with the defined movement of the predefined control movement type.

The foregoing and other advantages are provided by an apparatus for manipulating a curve object displayed in three-dimensional representation on a computer controlled display system having a computer and a display coupled to the computer, the apparatus comprising means for positioning a cursor over the displayed curve object and signaling the computer to activate a control movement mode, means for generating a three-dimensional representation of a virtual box enclosing the displayed curve object, means for signaling the computer to activate a predefined control movement type specified by the sensitive portion of the virtual box under the cursor and repositioning the cursor to define a movement of the predefined control movement type, and means for re-displaying the displayed curve object in accordance with the defined movement of the predefined control movement type. Other objects, features, and advantages of the present invention will be apparent from the accompanying drawings and from the detailed description which follows.

BRIEF DESCRIPTION OF THE DRAWINGS

The present invention is illustrated by way of example and not limitation in the figures of the accompanying drawings, in which like references indicate similar elements, and in which.

DETAILED DESCRIPTION IN ACCORDANCE WITH A PREFERRED EMBODIMENT

Figure 1:
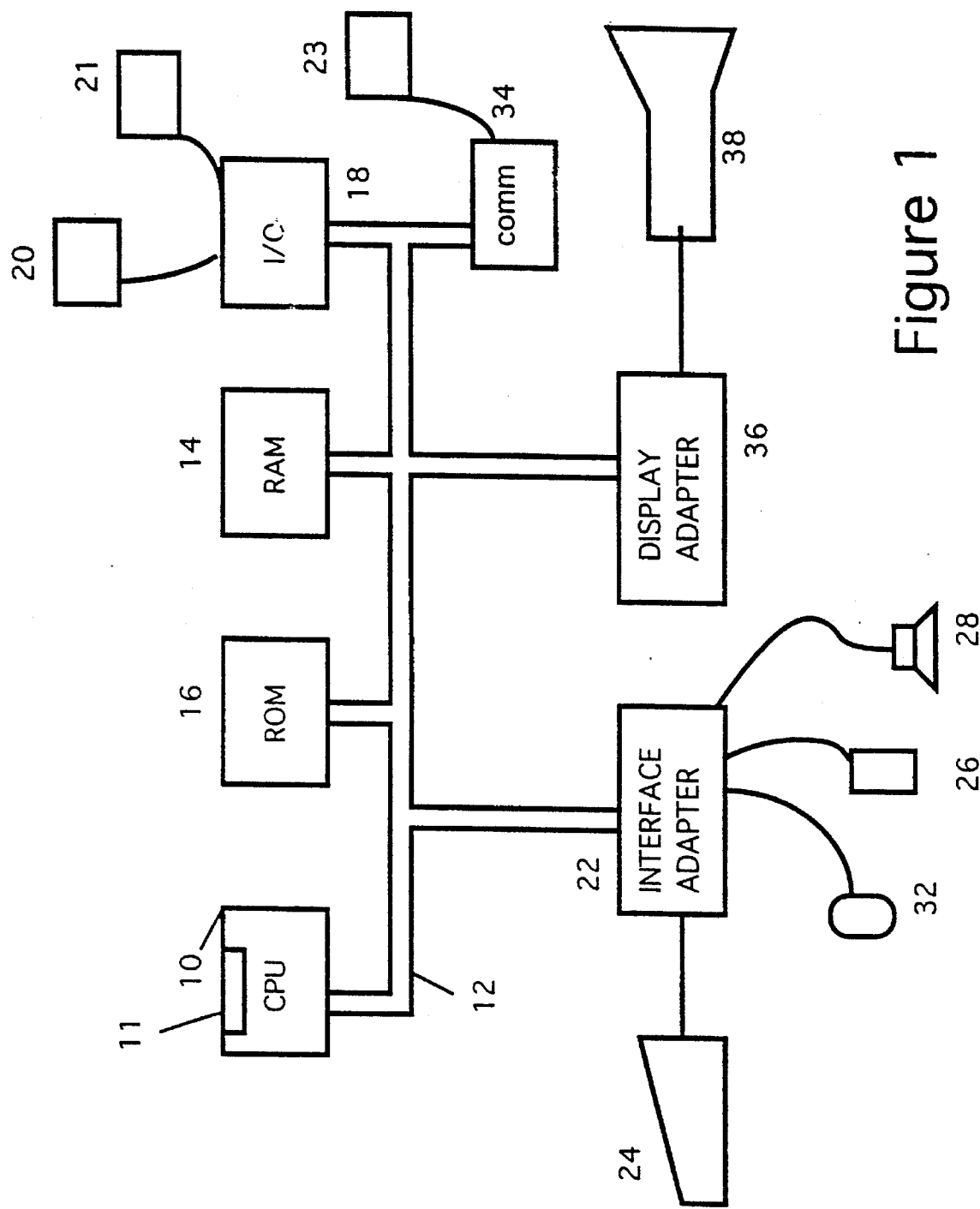
FIG. 1 depicts a generalized block diagram of a computer system as might be used by a preferred embodiment.

A preferred embodiment generally involves the manipulation of a computer displayed object represented in three-dimensional form, and it would be helpful to provide a brief discussion of the pertinent computer environment. Referring now to the drawings, and more particularly to FIG. 1, the invention is preferably for use in the context of an operating system resident on a general purpose computer 10. The computer 10 has a system unit 12 a high resolution display device 14, such as a cathode ray tube (CRT) or, alternatively, a liquid crystal display (LCD). The type of display is not important except that it should be a display capable of the high resolutions required for windowing systems typical of graphic user interfaces (GUIs). User input to the computer is by means of a keyboard 16 and a cursor pointing device, such as the mouse 18. The mouse 18 is connected to the keyboard 16 which, in turn, is connected to the system unit 12. Alternatively, the mouse 18 may be connected to a dedicated or serial port in the system unit 12. Examples of general purpose computers of the type shown in FIG. 1 are the Apple Macintosh® (registered trademark of Apple Computer) and the IBM PS/2. Other examples include various workstations such as the IBM RISC System/6000 and the Sun Microsystems computers.

Figure 2:
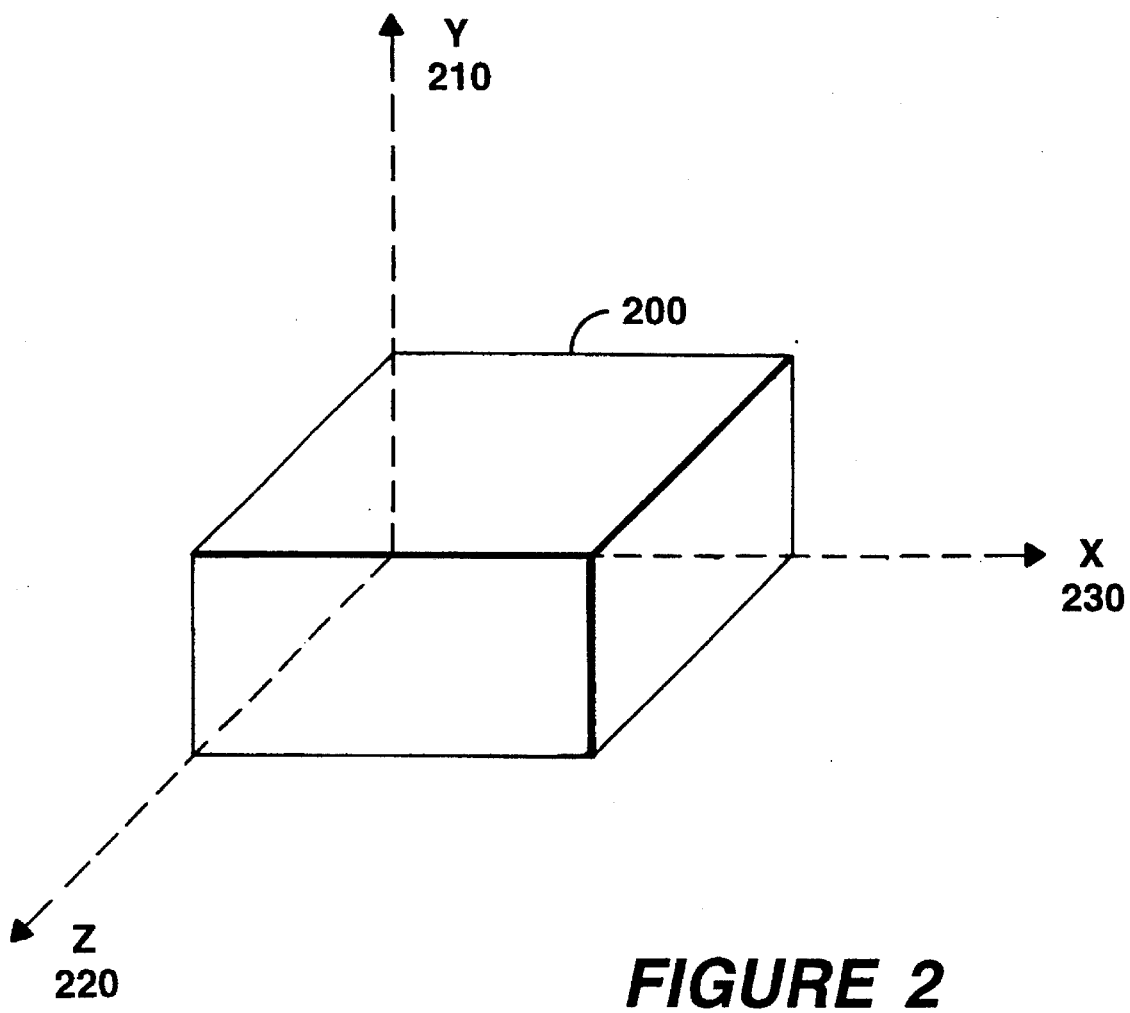
FIG. 2 depicts the object model coordinate system as used by a preferred embodiment.

Referring now to FIG. 2, the object viewed on the video display 14 can be referenced for convenience relative to an orthogonal coordinate system (having X, Y and Z axis) called the model coordinate system (or model space) that has its origin at the center of rotation of the object.

For ease of understanding, the following discussion will be in the context of using a two-dimensional input controller 18 that is a mouse (used in a preferred embodiment), but it should be readily appreciated by those skilled in the art that the disclosed techniques can be implemented with other 2D or 3D input controller devices.

A mouse controls the position of a mouse pointer (e.g., a reference indicator such as a cursor) that is displayed on the video display. The pointer is moved by moving the mouse over a flat surface, such as the top of a desk, in the desired direction of movement of the pointer. Thus, the two-dimensional movement of the mouse on the flat surface translates into a corresponding two-dimensional movement of the mouse pointer on the video display.

A mouse typically has one or more finger actuated control buttons. While the control buttons can be utilized for different functions, such as selecting a menu option pointed to by the pointer, the disclosed invention advantageously utilizes a single mouse button to select a 3D object and to trace the movement of the pointer along a desired path. Specifically, the pointer is located at the desired starting location, the mouse button is depressed to signal the computer to activate a control movement mode, and the mouse is moved while maintaining the button depressed. After the desired path has been traced, the mouse button is released. This procedure is sometimes referred to as dragging the mouse pointer. It should be appreciated that a predetermined key on a keyboard could also be utilized to activate dragging the mouse pointer.

In a preferred embodiment, when a 3D object displayed on a visual display of a computer system is selected by the user, a 3D "virtual box" or "bounding box" appears on the visual display such that the bounding box is proximal to the 3D object. One might view the bounding box as a glass box enclosing the selected object or positioned proximal thereto. The bounding box thus signals the user that the 3D object has been selected. Further, the bounding box allows for direct manipulation of the enclosed 3D object as will be explained below. Note that it is well within the scope of a preferred embodiment to provide a virtual box having a shape other than a generally rectangular or box shape. Such a virtual box could be of any of a great number of shapes including oblong, oval, ovoid, conical, cubic, cylindrical, multi-hedronical, spherical, etc. The virtual box could, for example, vary based on the geometry of the 3D object.

Direct manipulation of the 3D object, which manipulation generally comprises moving, scaling, or rotating the object, can be accomplished in various ways depending upon which embodiment the user has chosen and which implementation is supported by a given computer system.

Figure 3:
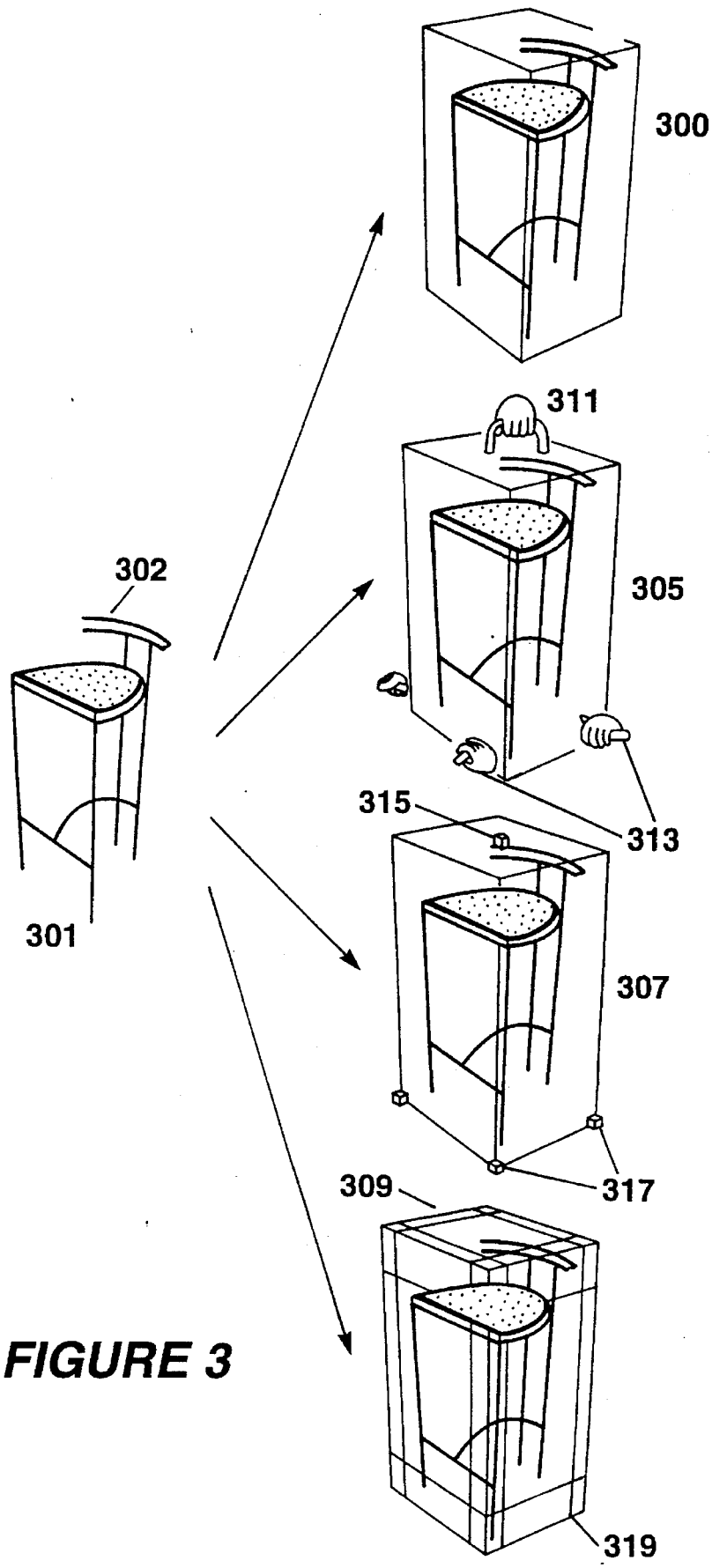
FIG. 3 depicts a 3D representation of an object and some alternative embodiments of an object surrounded by a bounding box in accordance with a preferred embodiment.

Referring now to FIG. 3, a 3D representation of an object 301, in this case a chair, is shown as displayed on the display of a computer system. When the user selects chair 301, by moving the mouse until the pointer 302 is on the chair and clicking on the chair by pressing the mouse button (or using a keyboard equivalent), the chair is surrounded by a bounding box 300. Alternative embodiments include a bounding box 305 with hands 313, a bounding box 307 with handles 315 & 317, and a bounding box 309 with active zones (or hot zones 319), as is explained more fully below.

In a preferred embodiment, the bounding box 300, which appears as a result of the user selecting the 3D object 301 and as was stated above, is a 3D transparent box which completely surrounds the selected 3D object 301, or is proximal thereto as explained below. The bounding box 303 is a visual clue to the user that the 3D object has been selected.

With the bounding box 305 employing a hands embodiment, the user is given further clues. Not only is the user informed that the 3D object 301 has been selected, but the user is also given indications as to what manipulation operations might be possible with the selected object. The top hand 311 of the bounding box 305 appears to be pulling the bounding box up (or pushing down or both) and thus indicates to the user that the 3D object can be lifted. The hands 313 around the base of the bounding box 305 with hands appear to be pushing or pulling the bounding box around in a circle and thus indicate to the user that this 3D object can be spun around if so desired.

A similar situation exists with the bounding box 307 with handles. Again, the user is given clues as to what manipulation operations might be possible with the selected object. The top handle 315 of the bounding box 307 appears to be available for grabbing and pulling the bounding box up (and/or pushing the bounding box down) and thus tells the user that the 3D object can be lifted up or down. The handles 317 around the base of the bounding box 307 appear to be available for pushing or pulling the bounding box around in a circle and thus tell the user that this 3D object can be spun around if so desired.

With the bounding box 309 and active zones, the user is given different clues (and, as will be explained below, some of these clues are user selectable to lessen any visual busyness which may exist with the visible active zones). Again, the bounding box-tells the user that the 3D object has been selected. Further, additional lines on the bounding box tell the user that there are different active, or hot zones available to be used.

Still further embodiments support spring-loaded object manipulations (as is explained below) by providing additional manipulation clues to the user. For example, a pointer changing to a curved arrow could indicate rotation manipulations in the case of a rotation active zone selection, to crossed arrows indicating the plane of movement in the case of a translation active zone selection and to an enlarging arrow indicating that dimensions are to be affected in the case of a scaling active zone selection. Further, a selected object's bounding box of a preferred embodiment could display a circle (or ellipse when the object and bounding box are in a perspective view) when a rotation active zone is selected to thus indicate the rotation possibilities with a given rotation active zone. The displayed circle could further display a curved arrow around a portion of the circumference of the displayed circle to thus signal a user as to the manipulations possible with the selected rotation active zone. Similarly, with translation manipulations, a translucent plane could be displayed to indicate the plane of translation available with a given selected translation active zone. Again, with spring-loaded active zones (further explained below), whenever the user stops pressing the mouse button, the manipulation icon or rotation circle would no longer be displayed, and the original pointer would again be displayed.

Figure 4:
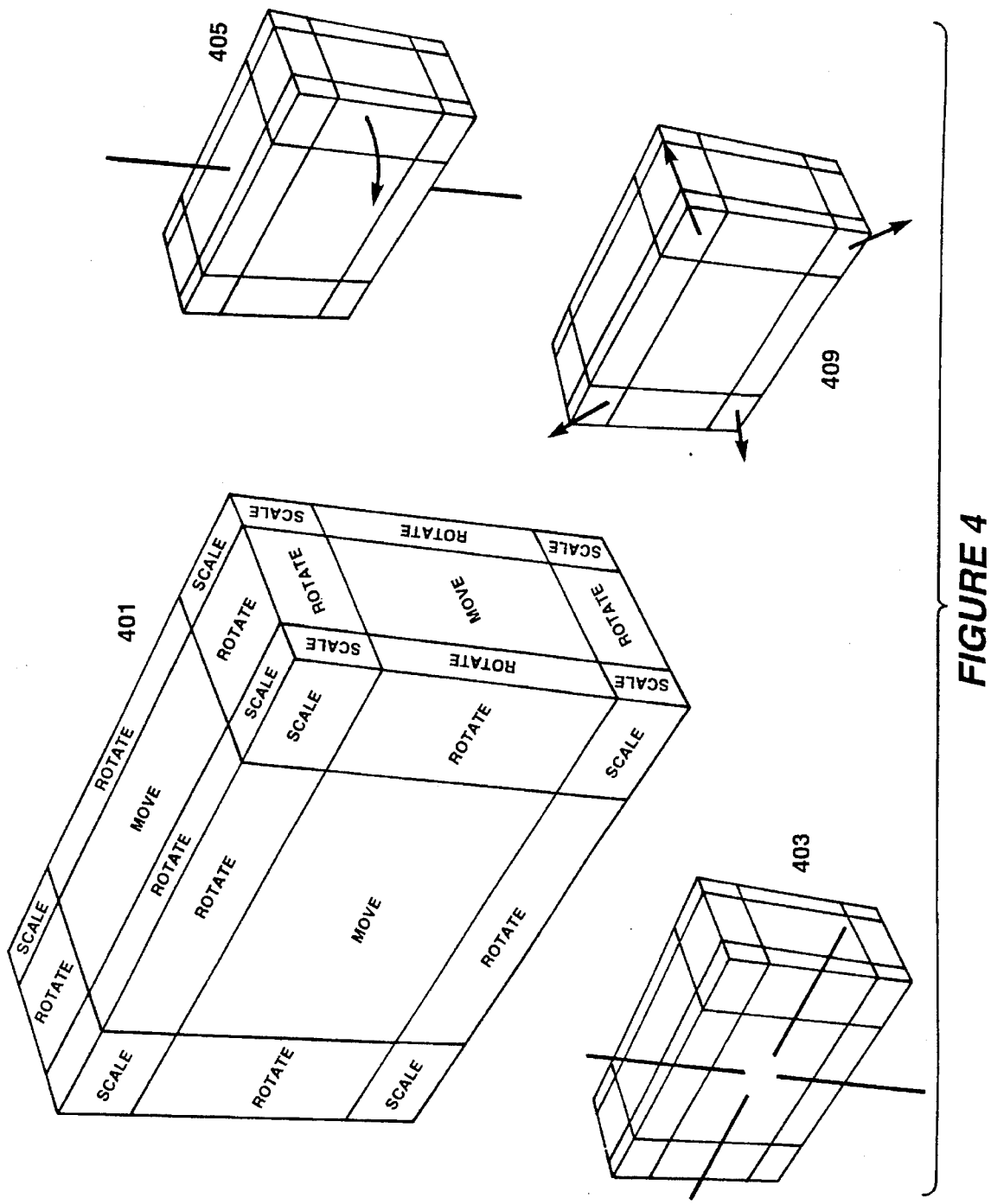
FIG. 4 depicts the active zone layout of a preferred embodiment and some of the object and bounding box manipulations supported by a preferred embodiment.

Referring now to FIG. 4, a bounding box with active zones 401 is shown. It should be appreciated by one with ordinary skill in the art that although a preferred embodiment utilizes a bounding box represented as a wireframe with no back lines visible and with the object remaining visible within the bounding box (e.g., bounding box 309 in FIG. 3), the back lines of the bounding could also be displayed, or the bounding box could even be displayed as a solid (no back faces or lines visible) with the object inside either visible (a transparent solid bounding box), not visible (an opaque solid bounding box), visible yet faint or greyed out (a translucent solid bounding box), etc., all as alternative embodiments which could be user selectable. Note, however, that no object is shown within the bounding box in FIG. 4 so as to avoid any potential visual clutter (which option could be user selectable in a still further alternative embodiment of a preferred embodiment).

In a preferred embodiment, each face of the bounding box with active zones 401 is divided into 9 active zones. Clicking the pointer in any one of these active zones and dragging will result in moving, rotating, or scaling the bounding box (along with the 3D object within the bounding box) depending upon which active zone is selected.

The bounding box 401 with active zones allows various paradigms for 3D object manipulation. To scale the 3D object, the user grabs a corner of the bounding box and pulls. To rotate the 3D object, the user grabs an edge of the bounding box turns the bounding box. To move (translate) the 3D object, the user grabs a face of the bounding box and slides the bounding box.

And again, with a bounding box, the user need not worry about where to grab a particular 3D object (regardless of object shape) in order to perform any one of the desired manipulations because the bounding box provides a consistent user interface across all object shapes. For example, if the 3D object is a floor lamp, the user need not worry about whether it is "proper" to pick up the lamp by the shade, the base, or the pole. This is because the bounding box consistently defines the available actions and means to perform those actions.

The bounding box with active zones 401, as shown in FIG. 4, shows the manipulations possible by clicking and dragging in the various active zones. The chosen operation (scale, rotate, or move) is determined by the active zone in which the user clicks. The axis or axis along which the bounding box is scaled, rotated, or translated is/are chosen according to the particular active zone and face which is clicked on.

Further, it is important to note that these manipulations are not limited to only one face of the 3D object but rather are available for each visible face (which can range from one to three faces depending upon the current orientation of the 3D object). It is also important to note that the particular manipulations for each active zone, as well as the number and type of active zones, could be user selectable such that the corner active zones perform rotation manipulations instead of scaling manipulations as is shown in the embodiment of FIG. 4. Furthermore, in a preferred embodiment, the visible lines delineating the active zones on the bounding box are optionally drawn a user settable distance or percentage in from each face edge of the bounding box (the "inset" as is explained more fully below) thus providing users with an explicit view of the active zone layout as well as allowing users to alter the relative sizes of the active zones. It should be appreciated by one of ordinary skill in the art that alternative active zone layouts and locations as well as having greater or fewer active zones (or to not show the active zones on the bounding box) is well within the scope of a preferred embodiment.

Bounding box with active zones 403 shows some of the move or translate manipulations available by clicking and dragging on the move active zone of the left front face of bounding box 401. The move manipulation allows moving the bounding box along with the 3D object inside across the plane of the chosen face of the bounding box. Note that the bounding box 403 with active zones can be moved anywhere within the chosen plane and is not limited to the direction of the arrows in the figure.

Bounding boxes 405 and 407 with active zones show some of the rotate manipulations available by clicking and dragging on the rotate active zones of the left front, top, or right side faces of the bounding box 401 with active zones. The rotate manipulation allows rotating the bounding box along with the 3D object inside around one of the three axis of the bounding box and the object within it. Bounding box 405 depicts rotation around the object's Y axis using the left or right active zones. Bounding box 407 depicts rotation around the object's X axis using the top or bottom active zones. Note that the rotation active zones are arranged so that clicking on either side near an edge will result in rotations around the same axis which makes the selection less sensitive to minor locational inaccuracies by the user and also provides for greater user interface consistency.

A preferred embodiment provides for de-coupled rotations about the three (X, Y and Z) axis. De-coupled rotations require rotations to occur around a single axis at a time. In many 3D object manipulation tasks (for example, arranging a scene containing a number of objects), rotating objects around a single axis at a time can be more intuitive than dealing with a coupled rotation around two or more axis. The manipulation is more predictable and thus a desired object orientation can be effected more quickly than would be the case otherwise.

Bounding box 409 with active zones shows some of the scaling manipulations available by clicking and dragging on the scaling active zones on the left front face of bounding box 401. The scaling manipulation allows re-sizing the bounding box along with the 3D object inside across one or two dimensions of the chosen face of the bounding box. Of course, re-sizing the bounding box along with the 3D object it contains across one or two dimensions of the chosen face alters the relative dimensions of the bounding box and object and is thus a non-homogenous scaling operation. An alternative embodiment of a preferred embodiment (user selectable by depressing a key on the keyboard) provides re-sizing (as opposed to re-shaping) the bounding box along with the object it contains across all three dimensions thus maintaining the relative dimensions of the bounding box and object and is thus a homogenous scaling operation. Please note that homogenous scaling operations would also tolerate greater user active zone selection inaccuracies because the same re-sizing operation would result from selecting any one of the up to three (depending upon bounding box orientation) displayed scaling active zones of a given bounding box corner.

In a preferred embodiment, the bounding box with active zones thus provides what might be termed nine degrees of freedom: movement in three directions (up to two concurrently); rotation about any one of the three axis; and scaling along three directions.

Note that displaying the active zones of bounding box 401 (and bounding box 309 of FIG. 3) could be user selectable. Displaying the lines delineating the active zones could be used as a beginner mode which the user could turn off after becoming more experienced. In this way, when the user has become more proficient with 3D object manipulation via bounding boxes with active zones, visually delineating the separate active zones could be turned off and the bounding box with active zones could be displayed as merely a bounding box as in 303 of FIG. 3. A more proficient user, who would likely be working with more complex 3D objects, could thus choose simpler bounding boxes without delineated visible active zones.

An advantage of the bounding box with active zones (whether visible or not) is its lack of modality. With the active zone bounding box implementation (and also with the alternative embodiments depicted in FIG. 3), it is not necessary to explicitly enter a "rotation mode," a "scaling mode," or a "move mode," via special commands, keystrokes, or palette selections. Instead, each "mode" is a temporary condition which is entered "on-the-fly" by clicking on one of the active zones (or handles in the alternative embodiments) and is exited by releasing the mouse button and might thus be termed "spring-loaded." Thus the particular manipulation mode chosen is only active while the mouse button remains pressed down.

This lack of modality can speed up user interaction because a translation (move) can immediately follow a rotation, for example, without requiring extra user actions that might break the flow of interaction or the user's train of thought. Obviously, the less the user has to stop and think about how to do that which the user wishes to do, the more intuitive, seamless and simple it is for the user to complete the desired task. Furthermore, a preferred embodiment allows these various sequential manipulations of the selected object to all be performed within a single window on the computer's display. In this way, the user need not worry about whether the current window is the right window for a particular manipulation type.

Still further, the bounding box provides direct manipulation capability which further increases its intuitiveness. Because the manipulation, be it moving, scaling, or rotating, is constrained to only one or two of the three possible axis of the 3D object, every position on the screen specifies exactly one particular movement, rotation, or scaling value. If the user keeps the pointer "pinned" to the spot on the bounding box originally clicked, the bounding box will appear to smoothly track the pointer movement. This further provides the desired kinesthetic feedback of direct locational coupling between the user motion and the 3D object display motion which thus increases user intuitiveness.

Still further, it should be appreciated that the manipulations of a preferred embodiment are performed in an absolute sense rather than in a relative sense. An absolute manipulation bases the current object position on the difference between the current object position and the original object position. Stated differently, the transformation for an absolute manipulation is a gross determination of the current position versus the original position of all of the object movements made by the current manipulation. Conversely, relative manipulations determine the current object position as an incremental difference from the previous object position. Stated differently, the transformation for a relative manipulation is an incremental determination of the current position versus the last position, or each small incremental object movement made by the current manipulation. The importance of using absolute manipulation determinations is the improved user intuitiveness. The improved user intuitiveness is due to the result of absolute determinations wherein when a user returns the pointer to the original location in an object manipulation, the object is returned to its original orientation because the gross difference is zero. Conversely, if relative determinations were used, the user could return the pointer to the original location in an object manipulation, yet the object might not return to its original orientation because the incremental differences might not be zero. The ability of a preferred embodiment to always return the object being manipulated to its original orientation if the user returns the pointer to the starting point of the manipulation thus provides greater user intuitiveness. Therefore, absolute manipulation determinations provide a dynamic undo capability because the user is able to undo an object manipulation by merely returning the pointer to its starting point.

Generally, the object to be manipulated is either in world space coordinates or in model space coordinates which are passed through transforms in order to reach world space coordinates as is explained more fully below (and either way the object must also pass through a viewing transform as is well known in the art) in order to be displayed. In a preferred embodiment, the object is stored in model space coordinates in order to facilitate more efficient manipulation calculations. Therefore, the object must first pass through a transformation, which translates the object to world space, before being displayed on the computer display.

In a preferred embodiment, this transformation from model space to world space is represented as three separate transformations; one for scaling, at least one for rotation (alternative embodiments support multiple rotation transforms, as is explained more fully below), and one for translation. The concatenation of these three transforms forms the complete transformation from model space to world space.

The scale and translation transforms, in a preferred embodiment, are separately stored as 3D vectors, and the rotation transform is stored as a 3×3 matrix. Storing the transforms separately allows for changing any component of the three separate transforms without affecting the other transforms. The alternative (storing a single transformation matrix) is less efficient because it would require additional matrix computations.

Figure 5A:
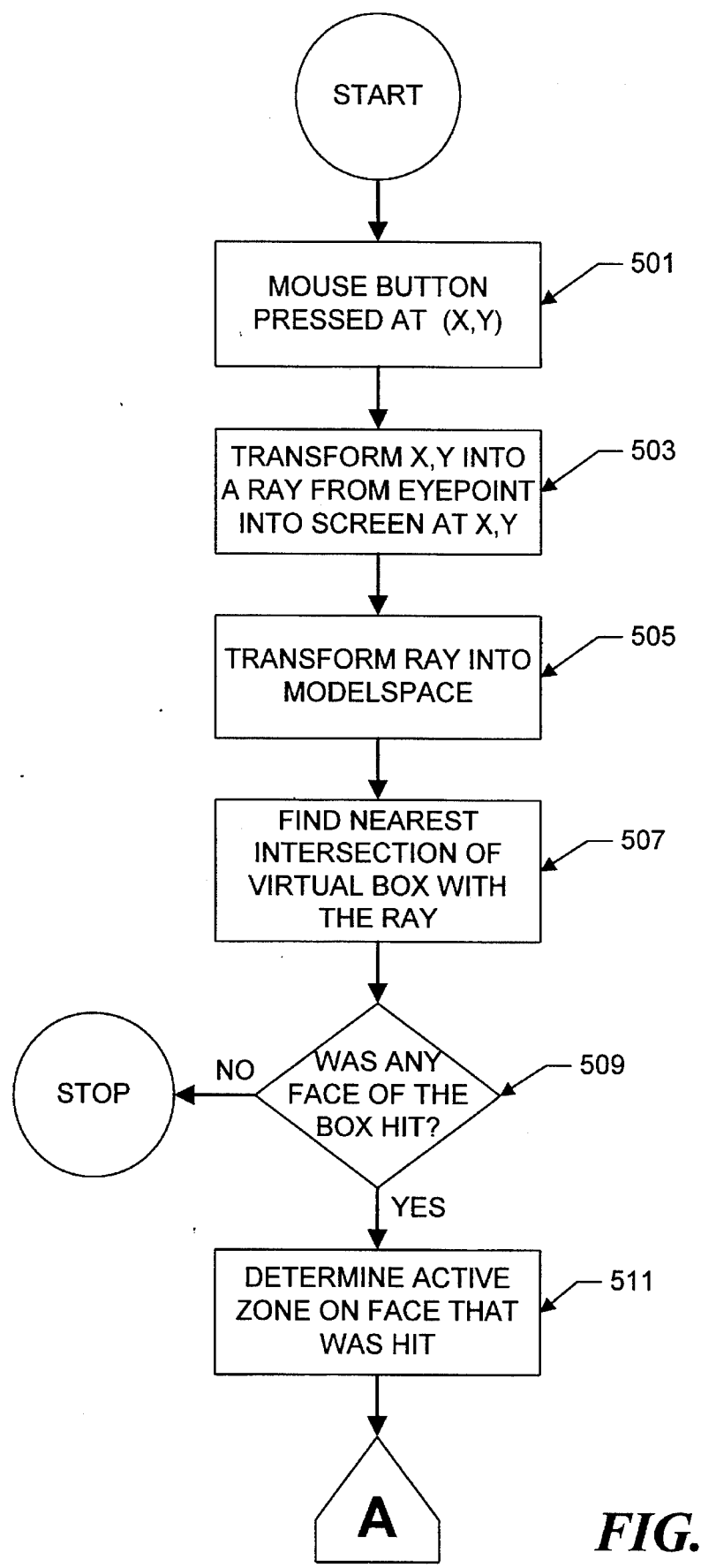
FIG. 5 is a flowchart depicting the sequence of steps preparing to handle a user manipulation in accordance with a preferred embodiment.
Figure 5B:
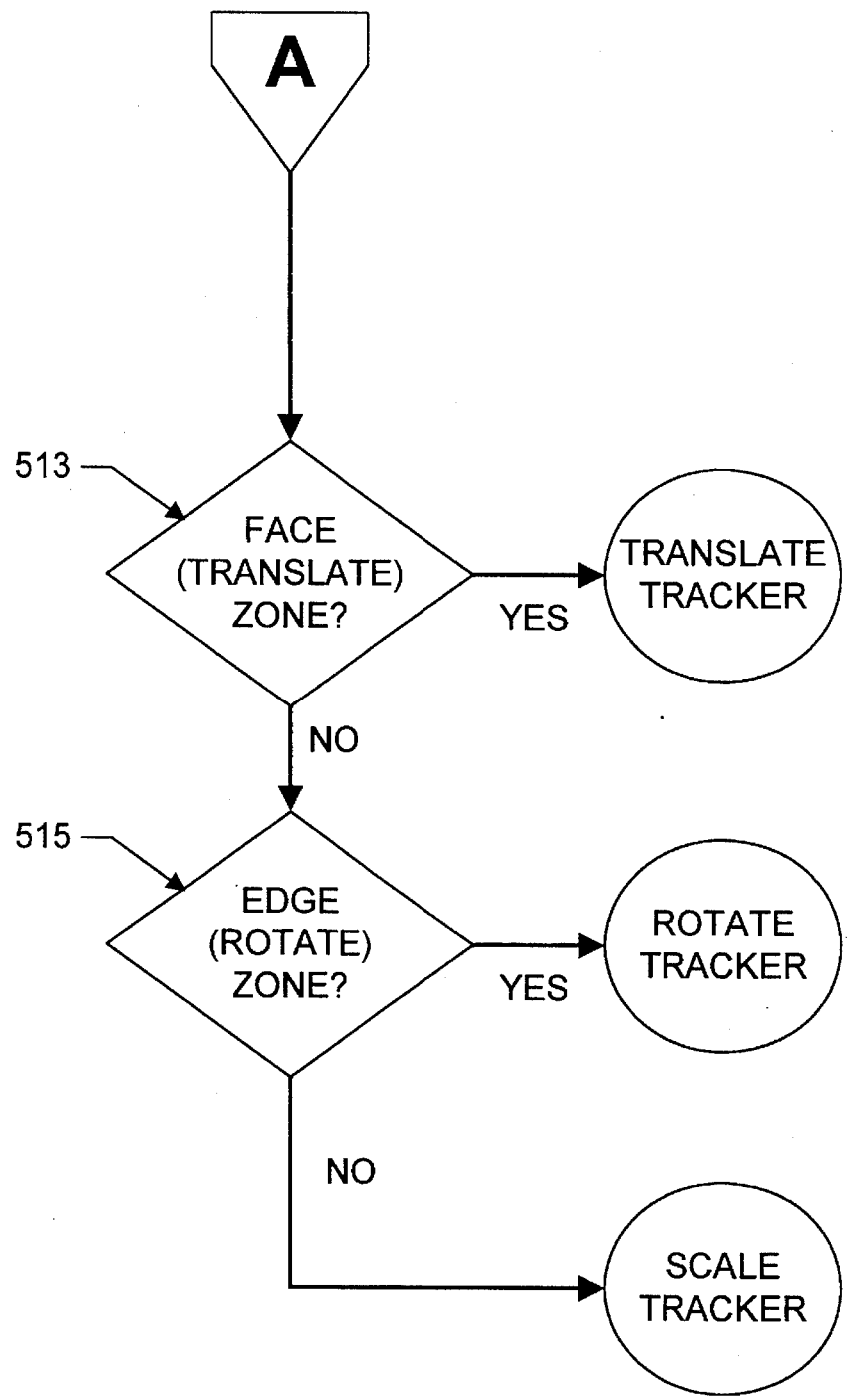

As was explained above, in a preferred embodiment, after an object has been selected, and the bounding box is displayed, the user can manipulate the bounding box and the object it contains by clicking on one of the spring-loaded active zones and dragging the bounding box in the desired direction of manipulation. Referring to FIG. 5, the user manipulation steps will now be described. After the object has been selected and the mouse button is again pressed 501, the next determination that needs to be made is whether the user is selecting an active zone in order to manipulate the bounding box and object or, alternatively, the user is de-selecting the bounding box. The x and y coordinates of the pointer location when the user pressed the mouse button down are used to create a ray from the eyepoint into the screen at that x,y pointer location 503.

Please note that creation of such a ray is well known in the art and utilizes a basic formula that many ray tracing image generation schemes use. In those schemes, the screen plane is scanned and a viewing ray is created for each pixel of the image. In a preferred embodiment, such a ray is created after each mouse button click when an object is selected.

Then, because the object is maintained in model space and the calculations in a preferred embodiment are performed in model space (which is computationally more efficient), the ray is transformed into model space 505. The ray is defined by its origin, which is equal to the camera position or "eyepoint," and its direction. The direction vector of the ray is constructed by concatenating the vector (x,y,vd) with the 3×3 submatrix of M, where vd is the viewing distance (the distance from the projection plane to the eyepoint of the virtual camera) and M is the transpose of the 4×4 viewing matrix of the virtual camera. The ray is then transformed into the object's local coordinate system (model space) by multiplying both the ray's origin and direction with the inverse of the current transformation matrix (formed by concatenating the three transforms, one for each of scale, rotate and translate, as is explained more fully below).

Once the ray from the eyepoint into the screen at x,y is transformed into model space it can then be determined whether the user had the pointer placed over the bounding box when the mouse button was pressed (to thus perform a manipulation). This is accomplished by finding the nearest intersection of the bounding box with the ray 507. Given a viewing ray (origin and direction) in 3D space, a 3D axis-aligned bounding box (where the planes/faces of the bounding box are perpendicular to the coordinate axis; note that this is also known as "canonical") with extents given by boxMin and boxMax (the coordinate-wise numerical minima and maxima, respectively, of the bounding box), and a 4×4 modeling transformation on the bounding box (in a preferred embodiment a concatenation of a scaling, a rotation and a translation transformation as was explained above and as will be further explained below), finding the intersection of the ray with the nearest face of the bounding box is a relatively simple matter which is well known in the art (see e.g., "Fast Ray-Box Intersection" by Andrew Woo, in Graphics Gems, Andrew Glassner, ed., Academic Press, 1990, or "Essential Ray-Tracing Algorithms" by Eric Haines, in An Introduction to Ray Tracing, Andrew Glassner, ed., Academic Press, 1989).

In a preferred embodiment and as was explained above, instead of intersecting the original viewing ray with a plane of the transformed bounding box, the viewing ray is inverse-transformed into the model space of the axis-aligned bounding box. This causes intersections to then occur with axis-parallel planes which thus simplifies the calculations. In a preferred embodiment, a 3D version of the Woo algorithm described in Graphics Gems (citation above) is used. Furthermore, only those faces of the box visible to the virtual camera need to be tested for intersection. Thus, there is at most one intersection between the visible faces and the viewing ray. The position of this intersection point, as well as a number of other variables as discussed below with respect to particular manipulations, is then recorded. Please note that in an alternative embodiment the dimensions of the face planes are extended slightly outward when the intersection calculations are performed because some users might expect to hit a bounding box edge even when they hit close to the edge yet are still just outside the bounding box.

If no face of the bounding box is hit by the ray (no intersection is found between the viewing ray and any visible face of the bounding box), which merely means the user moved the pointer to another area of the screen before pressing the mouse button, then in a preferred embodiment the object is de-selected and the bounding box would disappear ("stop" at step 509).

Conversely, if a face of the bounding box is hit by the ray (there is an intersection between the viewing ray and a visible face of the bounding box), then in a preferred embodiment the intersection points in the 2D coordinate space of the face that was hit are used to determine which and what type of active zone was hit.

In a preferred embodiment, each face of the bounding box is subdivided into nine active zone rectangular subregions which thus makes it a simple matter to determine in which of the nine regions the hitpoint lies 511. In a preferred embodiment, an index scheme is used to indicate which active zone was selected. It is already known that a face of the bounding box was hit, in a preferred embodiment determining which particular active zone is selected uses the following steps for each coordinate axis of the hit face:

```
ZONE = 0 (0000 in binary);
For the X axis:
is X > Xmin + insetx!
    yes:   is X > Xmax – insetx!
           yes:   hitpoint is in right portion of hit face
                  ZONE = ZONE + 1 (01 in binary)
           no:    hitpoint is in middle portion of hit face
                  ZONE = ZONE + 0 (00 in binary)
    no:    hitpoint is in left portion of hit face
           ZONE = ZONE + 2 (10 in binary)
For the Y axis:
IS Y > Ymin + insety!
    yes:   is Y > Ymax – insety!
           yes:   hitpoint is in top portion of hit face
                  ZONE = ZONE + 4 (0100 in binary)
           no:    hitpoint is in middle portion of hit face
                  ZONE = ZONE + 0 (0000 in binary)
    no:    hitpoint is in bottom portion of hit face
           ZONE = ZONE + 8 (1000 in binary)
```

Please note that X and Y in the above determinations must be replaced by appropriate indices determined by the coordinates of the current hitface, as was stated above.

Referring now to FIG. 5, by either logically OR'ing, or numerically adding the resulting values, an index value is generated which indicates which particular active zone was selected. For example, if the bottom left corner active zone (scaling, in a preferred embodiment) is selected, then the X axis determination would yield a value of 2 (10 in binary) and the Y axis determination would yield a value of 8 (1000 in binary). In that case, the resulting index value of the selected active zone hitpoint would be 10 (1010 in binary).

Similarly, if the right edge active zone (rotation in a preferred embodiment) is selected, then the X axis determination would yield a value of 1 (01 in binary) and the Y axis determination would yield a value of 0 (0000 in binary). In that case, the resulting index value of the selected active zone hitpoint would be 1 (or 0001 in binary).

Figure 6:
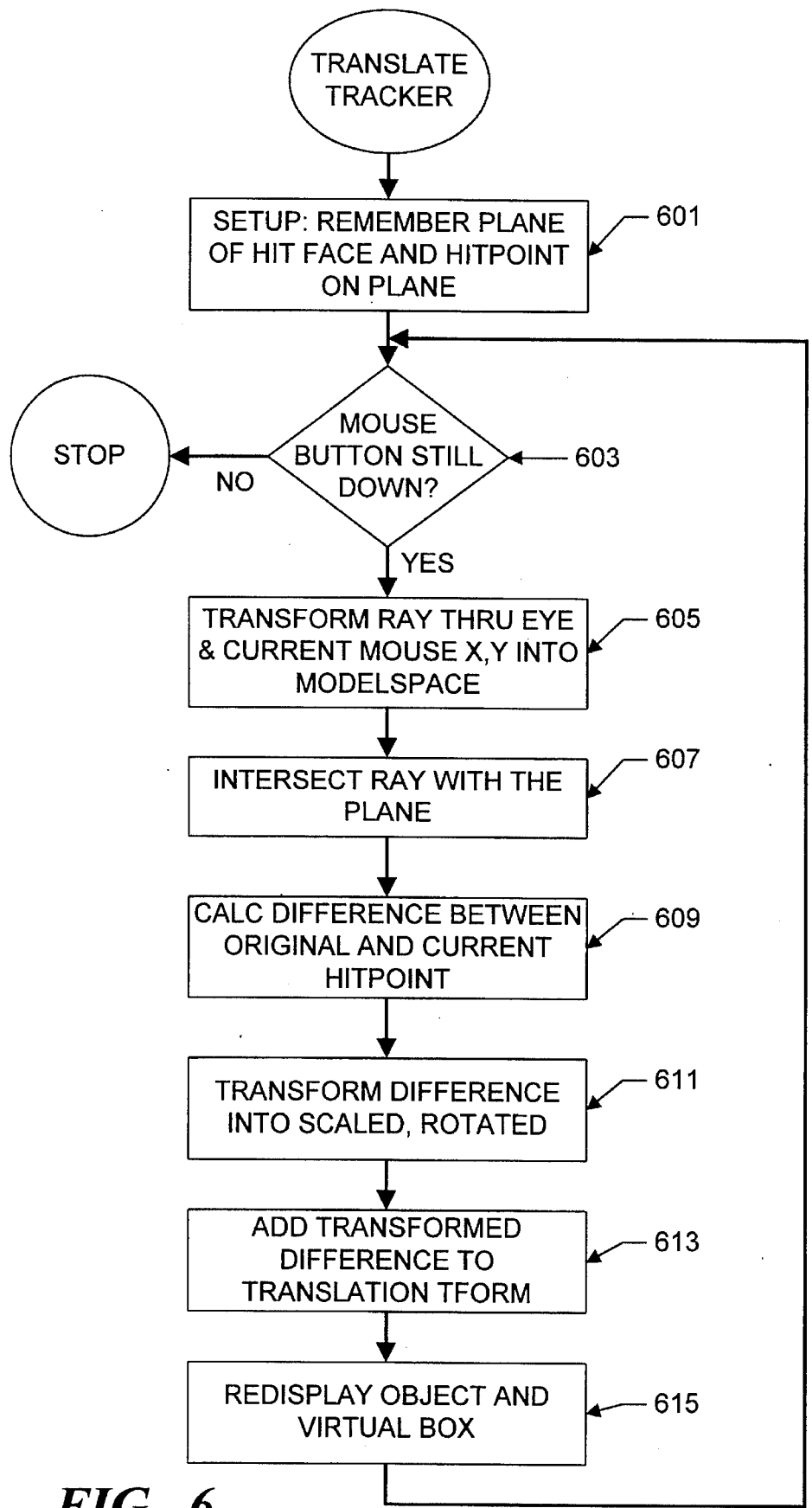
FIG. 6 is a flowchart depicting the translation manipulation sequence of steps in accordance with a preferred embodiment.

The classification (which manipulation type: scale, rotate or translate) of which of the nine actives zones of a preferred embodiment was hit is stored. Also stored, as is well known in the art, is the index of the axis that is perpendicular to the face that was hit. By assigning each axis to an index value (X=0, Y=1 and Z=2), it is a simple matter to determine the other two axis given any one of the three by merely adding 1 modulo 3 and 2 modulo 3 to the index of the given axis. Finally, a flag specifying which of the two parallel faces of the box along this axis was hit (the "polarity") is stored. Referring now to FIG. 6, the polarity is merely the face, of the two parallel faces, of the bounding box having the greater face value along the axis perpendicular to the hit face. Determination of the axis perpendicular to the hit face, determining the polarity of the hit face, and using indices for coordinate axis are techniques well known in the art. Together, these three variables completely determine the active zone that was hit (note that in total there are 9 active zones per box face and 6 box faces and therefore a total of 54 active zones in a preferred embodiment).

If a translation zone was hit by the viewing ray then a translation manipulation will be caused by any further movement of the mouse while the user continues to hold the mouse button down. This is discussed below with reference to FIG. 6. However, if a rotation zone was hit by the viewing ray then a rotation manipulation will be caused by any further movement of the mouse while the user continues to hold the mouse button down. This is discussed below with reference to FIG. 7. Lastly, if a scaling zone was hit by the viewing ray then a scaling manipulation will be caused by any further movement of the mouse while the user continues to hold the mouse button down. This is discussed below with reference to FIG. 8.

Referring to FIG. 6, the translation sequence will now be described. Again, as was stated above, the calculated active zone classification, the perpendicular axis and the polarity are stored. The original three separate scaling, rotation and translation transforms (at the time the mouse button was first clicked on the active zone) are also remembered. Finally, the indices of the two axis of the face that was hit are also stored. This is because in a translation manipulation the bounding box, and the object it contains, will be moved along the hit plane of these two axis.

After first determining that the user is still pressing the mouse button down 603 (whereas if not then the translation manipulation is exited) then a ray through the current mouse x,y location is transformed into model space 605. In other words, as long as the user is still pressing the mouse button, it must next be determined what effect any movement of the mouse as indicated by a change in pointer location would have on the bounding box and the object it contains. This is accomplished by first creating a ray from the eyepoint through the current mouse pointer x,y location and translating that ray into the model space of the object. This ray translation, as was explained above with reference to the active zone selection, is achieved by an inverse transform which thus simplifies the following calculations because all box-planes are axis-parallel in model coordinate space.

Then it is determined where the translated ray intersects the plane of the selected face and active zone 607. The equations for the planes through the hit face are simple in model coordinates:

axis perp. to hit face plane equation (in normal, distance form)

x n=[1 0 0], d=−IPx
y n=[0 1 0], d=−IPy
z n=[0 0 1], d=−IPz

Where IP is the 3D intersection point of the original ("mouse-down") viewing ray which selected the bounding box active zone in model coordinates. To intersect a plane (n,d) with a viewing ray in model coordinates (origin', direction'), one must first calculate the parametric t along the ray where the intersection occurs:

$$t = -(n \bullet origin' + d/n \bullet direction')$$

where ● denotes the dot product. Please note, however, that in a preferred embodiment, full dot products are not necessary because the plane normals n are very simple because the zeroes cancel out and hence two-thirds of the calculations need not even be made. To get a 3D intersection point, t must merely be back-substituted into the ray equation such that:

$$IP = origin' + t \bullet direction'$$

Now IP is the new intersection point in model coordinates. Again, in a preferred embodiment, only two of the three coordinates of the new IP need to be calculated because the third coordinate stays constant as the bounding box and the object it contains moves in the chosen plane.

This thus provides two intersection points in the plane the bounding box and the object it contains are to be translated in: the original hitpoint that was stored in step 601 and the current hitpoint just now determined in step 607. Next the difference between these two hitpoints is calculated 609. This difference, which represents the amount of movement or translation the user has indicated via movement of the mouse pointer, is then transferred into scaled, rotated coordinates 611.

The new translation is added to the original translation transformation and the translation transformation is set to this sum 613. In other words, the new translation is added to the original translation transformation in order to create a new combined translation transformation which includes the user's latest manipulations.

Figure 9:
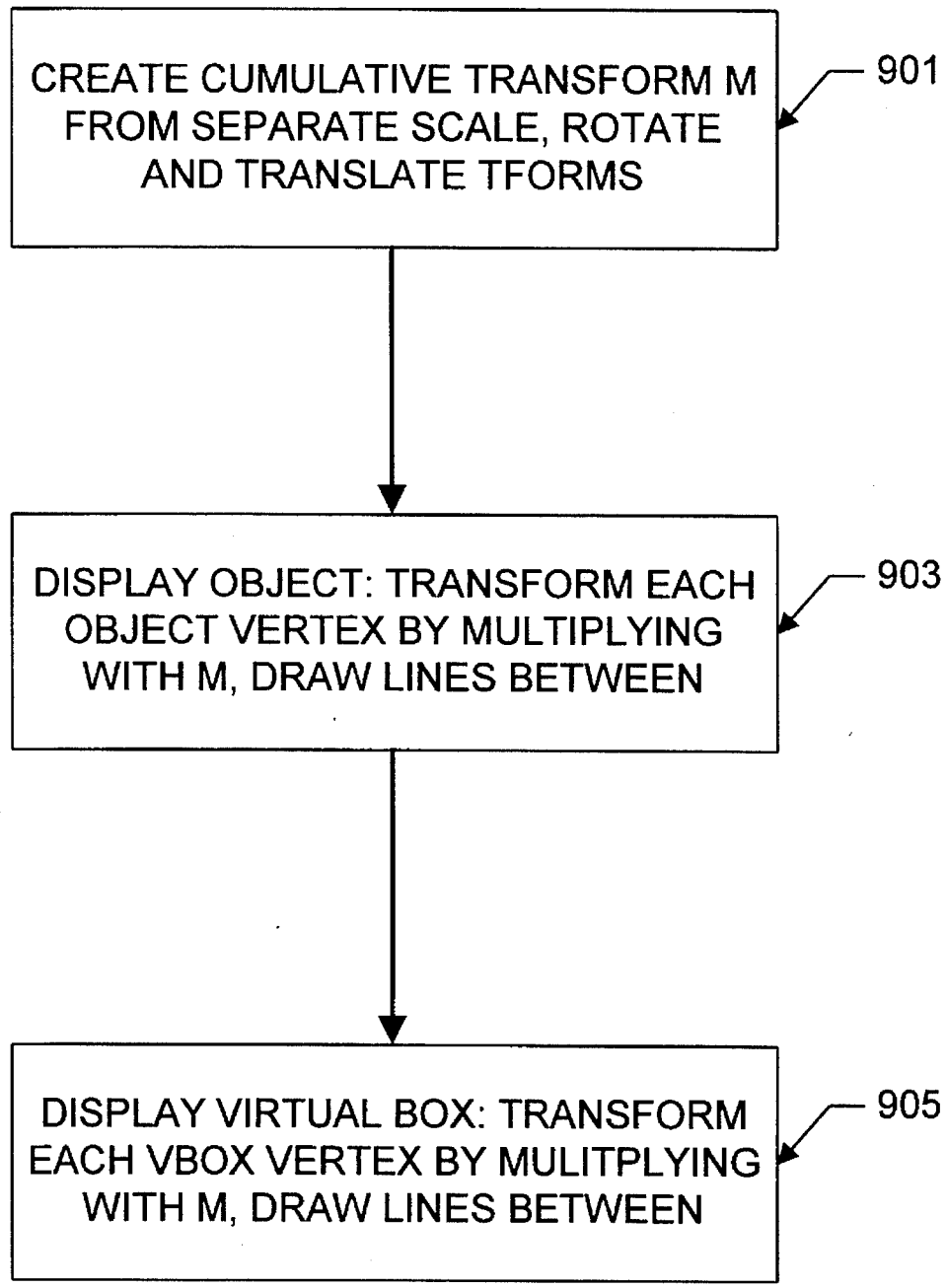
FIG. 9 is a flowchart depicting the sequence of steps to re-display a manipulated object and bounding box in accordance with a preferred embodiment.

Now that the translation transform includes the latest user manipulation, the bounding box and the object it contains can be re-displayed 615. Referring now to FIG. 9, re-displaying the bounding box and the object within it is achieved by first creating a cumulative transform M from the current three separate scale, rotate and translate transforms 901. Then the object is re-displayed, in a preferred embodiment, by transforming each vertex of the object from model space to world space by multiplying the vertices by M, passing the transformed object vertices through a viewing matrix V (which defines where the camera is located, where the camera is pointed, the focal length of the lens, and the camera screen geometry; please note that these techniques are well known in the art) and drawing lines between the transformed object vertices 903. Finally, to re-display the bounding box, in a preferred embodiment, each vertex of the bounding box is transformed by multiplying the vertices by M and the viewing matrix V and drawing lines between the transformed bounding box vertices 905.

Referring again to FIG. 6, after re-displaying the object and bounding box 615, the mouse button is again checked 603 to determine whether the user has finished all current translation manipulations. If the user has finished all current translation manipulations, the user will no longer be pressing the mouse button. However, if the user has not yet finished all current manipulations then the user will still be pressing the mouse button and the same sequence of steps 605 through 615 will be followed. In this way, the bounding box and the object within it will appear to the user to continuously move, or translate, across the screen as the user moves the pointer with the mouse while continuing to hold the mouse button down. These continuous movements will only pause while the user stops moving the mouse and will only stop when the user stops pressing the mouse button down.

In an alternative embodiment, a gridding capability is provided whereby movements would be constrained along box coordinate system axis so as to stay on the intersections of a three-dimensional grid. In a further embodiment, the gridding is enabled after the intersection point is transformed into world space, resulting in gridding in world space which would thus not be affected by the orientation of the bounding box in model space. In a still further embodiment, a constrain mechanism is triggered by the user holding down the shift (or other) key when pressing the mouse button to select an active zone and manipulate the bounding box and object within. The shift-constrain mechanism would constrain the bounding box and object to movements which lie along the one axis which has the larger translation component at the time the shift key is pressed. A still further alternative embodiment would limit translation to a specified volume in 3D space. For example, when moving a chair in a room on the visual display the chair would be limited by the room boundaries.

Figure 7:
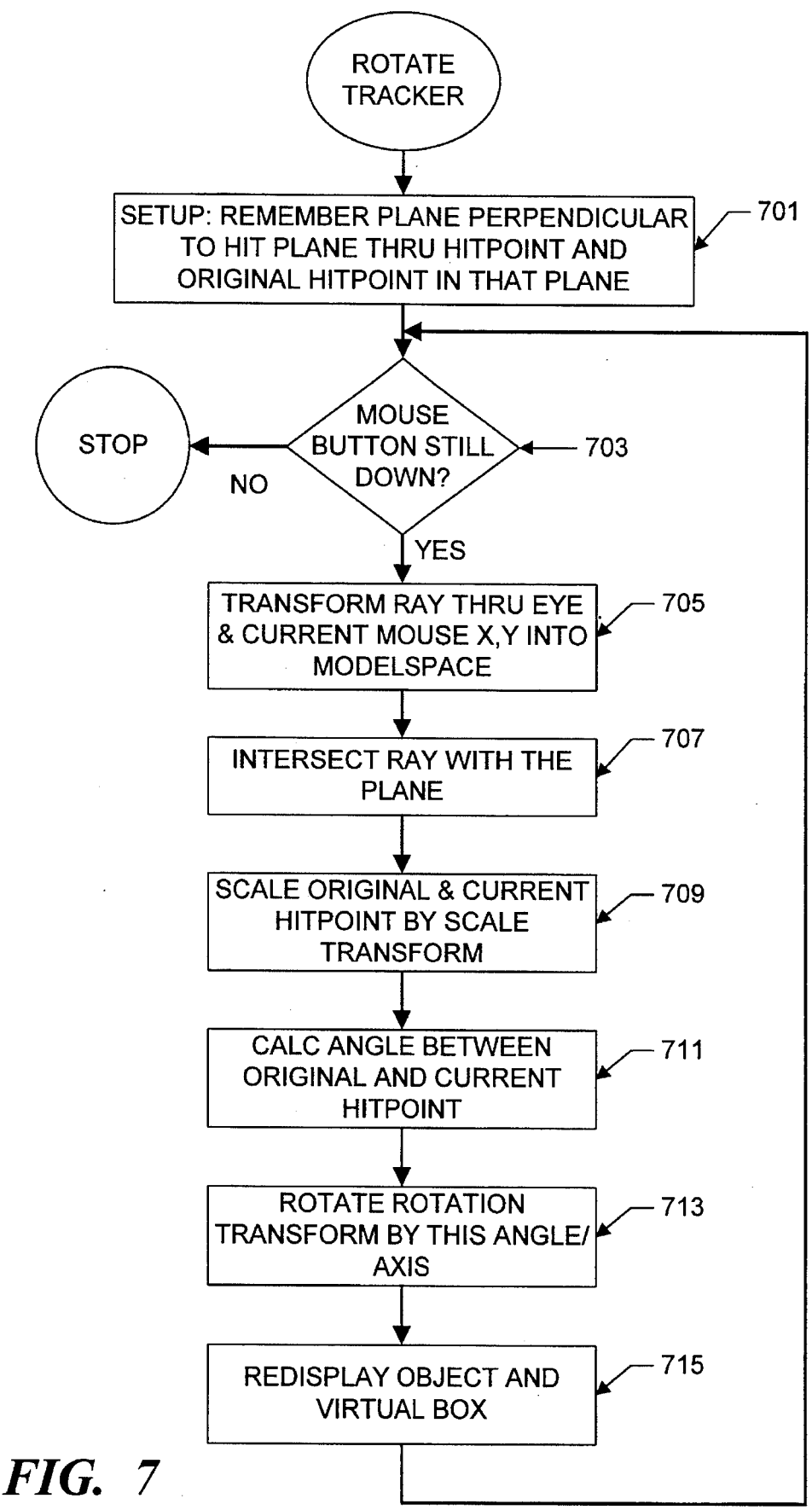
FIG. 7 is a flowchart depicting the rotation manipulation sequence of steps in accordance with a preferred embodiment.

Referring to FIG. 7, the rotation sequence will now be described. Again, as was stated above, the calculated active zone classification, the axis and the polarity are stored. The original three separate scaling, rotation and translation transforms—at the time the mouse button was first clicked on the active zone—are also saved 701. Finally, the index of the axis around which rotation will occur is also stored. This is because in a rotation manipulation the bounding box and the object it contains will be rotated around this axis. Please note that in a preferred embodiment the center line of the bounding box, which passes through the origin of the model space coordinate system, is the axis of rotation. Alternative embodiments support moving the axis of rotation elsewhere within the box, for instance to an edge of the bounding box, and even to an axis outside of the bounding box. Furthermore, in an alternative embodiment of a preferred embodiment, an indicator such as a cross-hair or visible rotation axis line would be displayed when a rotation manipulation was selected to thus inform the user of the current axis of rotation.

After first determining that the user is still pressing the mouse button down 703 (whereas if the user has stopped pressing the mouse button down then the rotation manipulation is exited) then a ray through the current mouse x,y location is transformed into model space 705. Please note that this is accomplished in the same manner as step 605 in the translation manipulation sequence.

Then it is determined where the translated ray intersects the plane of the selected face and active zone 707. Please note that this is accomplished in the same manner as step 605 in the translation manipulation sequence. This thus provides two intersection points in the plane the bounding box and the object it contains are to be rotated in: the original hit point that was stored in step 701 and the current hitpoint just now determined in step 707.

Next, both the original hitpoint A and the current hitpoint B are inverse-transformed through the scale transform 709. Please note that it is important to include the scaling transform (as was stated above) when calculating the intersection points A and B. This is because non-homogenous scaling transforms would change the angles, so in a preferred embodiment angle a (explained below) is calculated in scaled space. Please note that because all operations can now be performed in model space with axis-aligned planes, calculating this angle is essentially two-dimensional and is thus computationally more efficient than using a full 3D algorithm. Two lines are formed from the origin 711 of the bounding box, one line through the original intersection point A of the original viewing ray with the bounding box and one line through the intersection point B of the current viewing ray with the rotation plane. The angle between them is then determined by the equation:

$$a = \text{arctangent} \, (-A \times B / A \bullet B)$$

$$\text{if } (A \bullet B < 0), \text{ then}$$

$$\quad \text{if } (A \times B < 0)$$
$$\quad\quad a = a + p$$
$$\quad \text{else } a = a - p$$

where $\bullet$ is the dot product and x is the cross product.

Referring again to FIG. 7, this angle a is used to construct a rotation matrix which is then preconcatenated into the original rotation matrix (earlier stored, as was discussed above with reference to step 701) and the rotation transform of the bounding box is then set to this compound transform 713.

Lastly, now that the rotation transform includes the latest user manipulation, the bounding box and the object it contains can be re-displayed 715. Please note that this is accomplished in the same manner as step 615 in the translation manipulation sequence (and thus follows the sequence of steps discussed above with reference to FIG. 9).

After re-displaying the object and bounding box 715, the mouse button is again checked 703 to determine whether the user has finished all current rotation manipulations. If the user has finished all current rotation manipulations, the user will no longer be pressing the mouse button. However, if the user has not yet finished all current rotation manipulations then the user will still be pressing the mouse button and the same sequence of steps 705 through 715 will be followed. In this way, the bounding box and the object within it will appear to the user to continuously move, or rotate, on the screen as the user moves the pointer with the mouse while continuing to hold the mouse button down. These continuous movements will only pause while the user stops moving the mouse and will only stop when the user stops pressing the mouse button down.

In an alternative embodiment, the rotation manipulations are constrained to increments of multiples of a predefined angle. For instance, increment angles would be constrained to multiples of 45 degrees when the shift key is held down during rotations. To constrain the angle, the rotation transform of the bounding box would be stored as three successive rotation angles, one of which would be added to a to constrain the result. In a still further embodiment of a preferred embodiment, if the rotation transform was stored as three successively applied rotation angles around the X, Y and Z axis respectively, then the rotation angles could be limited or gridded separately for each of the three axis. This would provide for simulating certain joint styles such as an elbow joint or a shoulder joint which have limited ranges of rotation or even no range of rotation along some axis and would also provide for a "ratchet wheel" simulation where rotation angles are quantized to specified multiples of an angle.

Figure 8:
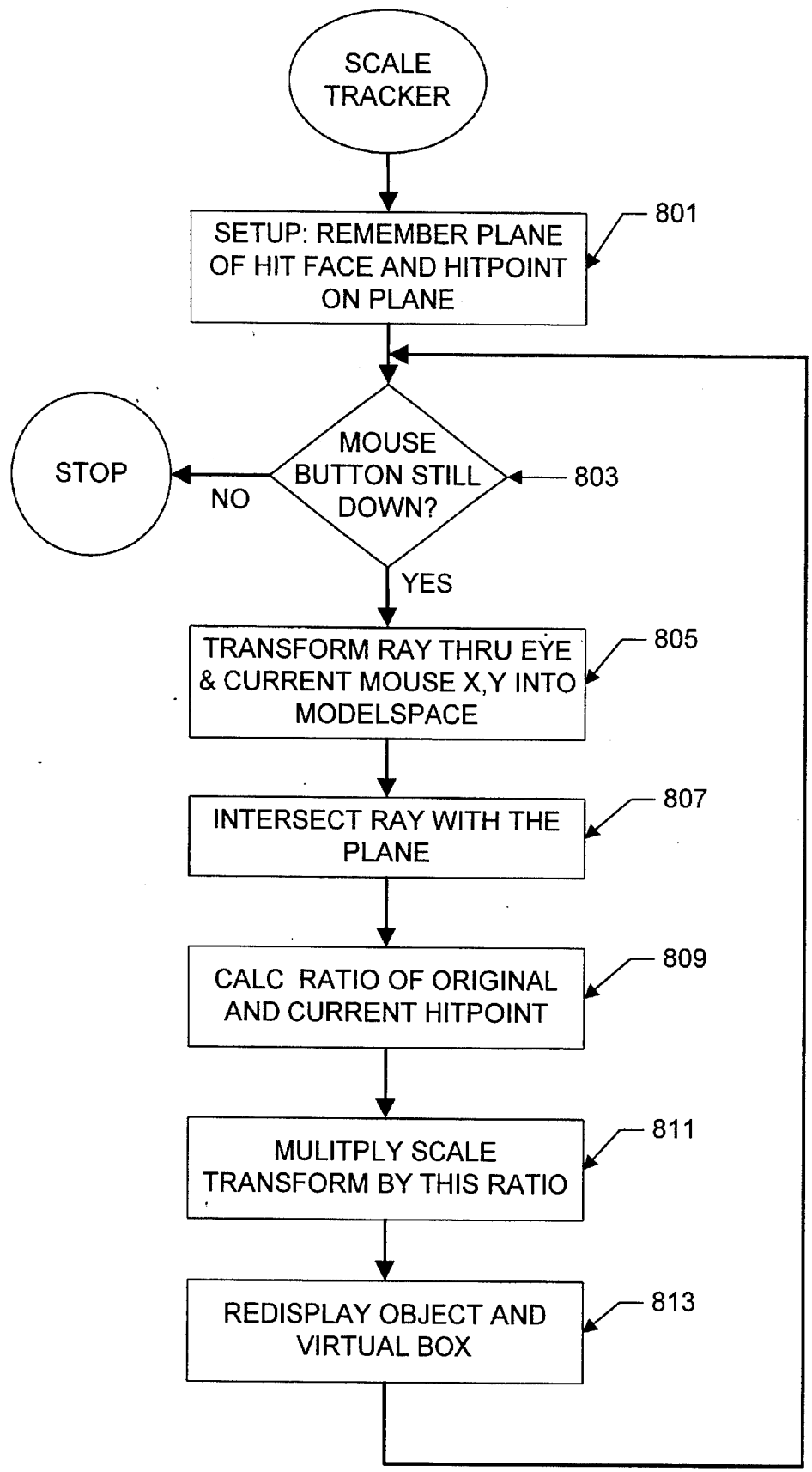
FIG. 8 is a flowchart depicting the scaling manipulation sequence of steps in accordance with a preferred embodiment.

Referring to FIG. 8, the scaling sequence will now be described. Again, as was stated above, the calculated active zone classification, the axis and the polarity are stored. The original three separate scaling, rotation and translation transforms—at the time the mouse button was first clicked on the active zone—are also saved 801. Finally, the index of the plane in which scaling will occur is also stored. This is because in a scaling manipulation the bounding box, and the object it contains, will be scaled in a single plane in a preferred embodiment.

After first determining that the user is still pressing the mouse button down 803 (whereas if the user has stopped pressing the mouse button down then the scaling manipulation is exited) then a ray through the current mouse x,y location is transformed into model space 805. Please note that this is accomplished in the same manner as step 605 in the translation manipulation sequence.

Then it is determined where the translated ray intersects the plane of the selected face and active zone 807. Please note that this is accomplished in the same manner as step 605 in the translation manipulation sequence. This thus provides two intersection points in the plane the bounding box will be scaled in: the original hit point A that was stored in step 801 and the current hitpoint B just now determined in step 807 as can be seen with reference to FIG. 19. Next, the ratio of the original hitpoint A and the current hitpoint B is determined 807. Note that neither of these points needs to be inverse transformed before this calculation can be made because they are both already in the same space and because they are both only one transform away from model space. In other words, because both the original hitpoint A and the current hitpoint B are only the scaling transform away from model space, they are in the same relative space and scaling calculations can be made directly on them.

Referring again to FIG. 8, these 2D points A and B are then used to update the scaling transform 811. The ratio of B/A is then multiplied into the current scaling transform to yield a new scaling transform. Please note that in a preferred embodiment scaling along the one axis that is not involved remains unchanged by these computations.

Lastly, now that the scaling transform includes the latest user manipulation, the bounding box and the object it contains can be re-displayed 813. Please note that this is accomplished in the same manner as step 615 in the translation manipulation sequence (and thus follows the sequence of steps discussed above with reference to FIG. 9).

After re-displaying the object and bounding box 813, the mouse button is again checked 803 to determine whether the user has finished all current scaling manipulations. If the user has finished all current scaling manipulations, the user will no longer be pressing the mouse button. However, if the user has not yet finished all current scaling manipulations then the user will still be pressing the mouse button and the same sequence of steps 805 through 813 will be followed. In this way, the bounding box and the object within it will appear to the user to continuously scale on the screen as the user moves the pointer with the mouse while continuing to hold the mouse button down. These continuous movements will only pause while the user stops moving the mouse and will only stop when the user stops pressing the mouse button down.

In an alternative embodiment, and similarly to an alternative embodiment of the translation manipulation as discussed above, scaling is gridded or constrained. This would prevent objects from becoming smaller than a predefined (or user settable) minimum size and would prevent a negative scaling manipulation which would otherwise cause an object to flip around within itself.

A further consideration arises when, due to the camera position (the user's viewpoint) and the physical display size or area available for object display (e.g., the object could be in a window on the display which window is smaller than the total display area), the object to be manipulated is larger than the area available to the user. In this case, generating a bounding box which encloses the object would thus cause the bounding box to also be larger than the available viewing area and as such the user would not be able to view all of the normally visible faces of the bounding box and thus the user would potentially not have access to some or all of the normally available object manipulations.

To address this issue, an alternative embodiment would, upon noting an object size larger than the available viewing area, provide a reduced size bounding box thus still providing the user with complete access to all of the available object manipulations. The implementation of such an alternative embodiment would be readily apparent to one of ordinary skill in the art based upon the teachings of a preferred embodiment (e.g., a scaling factor could be applied to the object dimensions to fool the bounding box generation means into thinking that the object is smaller than it actually is).

Providing a bounding box which is not of equal size with the dimensions of the object to be manipulated provides further capabilities. For instance, if the user wished to manipulate multiple objects as a single group, a reduced size bounding box based on a space size which encompasses all of the objects desired to be included in the group could be used. Stated differently, objects (for instance furniture in a room or scene) could be individually selected thus providing a finite sized bounding box. Alternatively, a scene of objects (for instance a room containing furniture) could be selected thus again providing a finite sized bounding box, albeit reduced in size to provide user access to all of the available manipulations, but one which properly acts as if it encloses all of the objects which are included in that scene. Still further, a larger space than a scene (for instance, a house containing multiple rooms where the viewer is within the house) could be selected thus providing an infinite sized bounding box which, again, is of a reduced size to facilitate full user manipulation. The virtual box controller can be used for many applications. In fact, this versatility makes it an attractive choice as the "standard" or "ubiquitous" direct manipulation method for 3D in an operating system in accordance with a preferred embodiment. Having a single, powerful manipulator presents a far more consistent and easier to learn interface than using a variety of domain or task-specific manipulators as is common in other graphics applications or systems. As yet, no other interaction controller has proved as versatile and easy to use for this purpose.

Manipulation of Space

Figure 10:
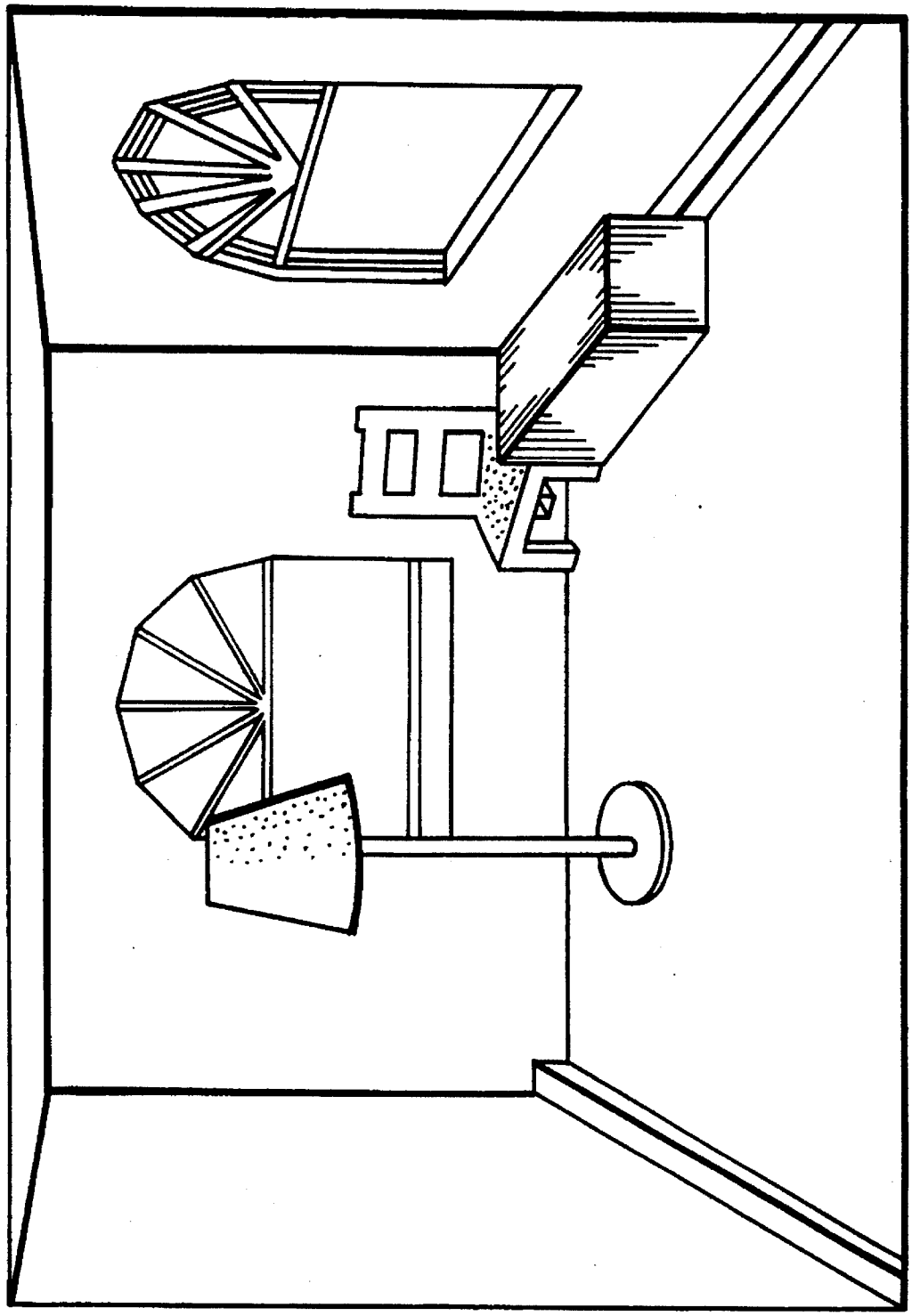
FIG. 10 illustrates a virtual box being used to move a 2D representation of a 3D space in accordance with a preferred embodiment.

FIG. 10 illustrates a virtual box being used to move a 2D representation of a 3D space. This processing is referred to as space handles. The virtual box here moves all of the objects in the scene at the same time. Interpreted another way, it moves the virtual camera or "space" the objects live in. For specialized application, such as architectural presentations, convenient locations for such "space handles" could be on floors, ceilings, staircases etc. Note again that not only a particular object moves, all of them do, but according to the same convenient virtual box interface that is used to manipulate a single object. The space can be moved (changing the camera location and center of interest), rotated (rotating the camera location around the center of interest) and scaled (changing the camera's focal length or "zoom").

For other applications, space handles could be scattered sparsely around in 3D space (e.g. in a 3D grid) and any one of them could be used to manipulate the view. For this application of the virtual box, the drawing of the controller would be persistent, i.e. not serve as selection feedback. A different color code could be used for a space handles to distinguish a space handle from a virtual box serving as selection feedback and object controllers.

Manipulation of Lights, Cameras & Curves

Figure 11:
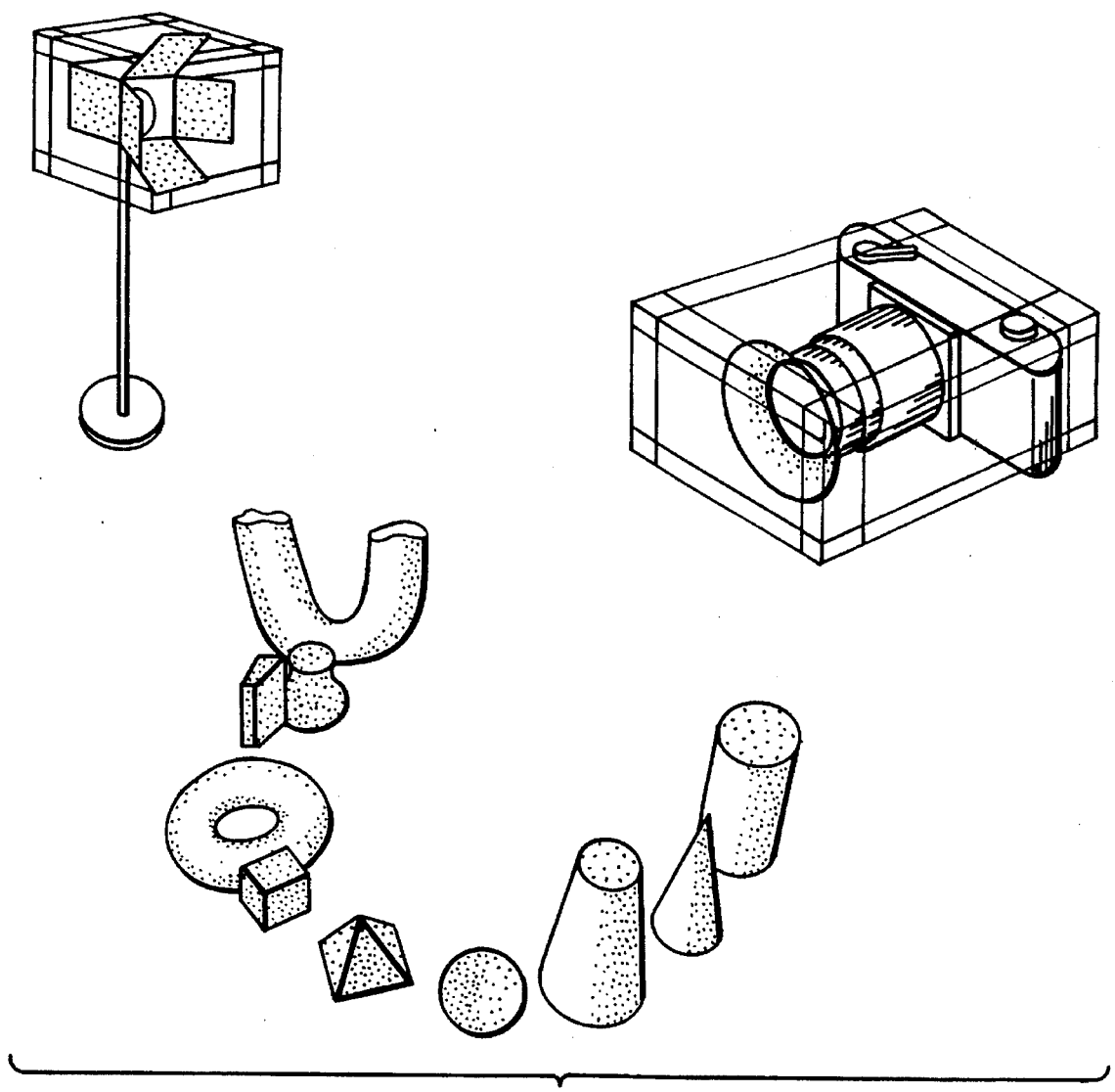
FIG. 11 illustrates a virtual box being used to manipulate lights or cameras in accordance with a preferred embodiment.

FIG. 11 illustrates a virtual box being used to manipulate lights or cameras. In this example, there are virtual box controllers around the spotlight on the left and the virtual camera on the right. These controllers allow interactive, in-scene movement and rotation of lights and cameras. Scaling would be possible, but ignored as far as lights & cameras are concerned. A virtual box can also be used to directly manipulate 3D curves. Curves in 3D are traditionally very hard to edit using direct manipulation techniques, because their projections look so two-dimensional and small movements or shape changes are very hard to interpret correctly when the curve is viewed in perspective. A virtual box interface provides an intuitive, consistent and powerful way of changing

- curve shape (moving a point on the curve to anywhere in space)
- local curvature (flattening or sharpening the curve near a point)
- tangent direction
- orientation of an osculating plane All of these attributes can be changed using a single virtual box controller.

Details of 3D Curve Manipulation

Figure 12:
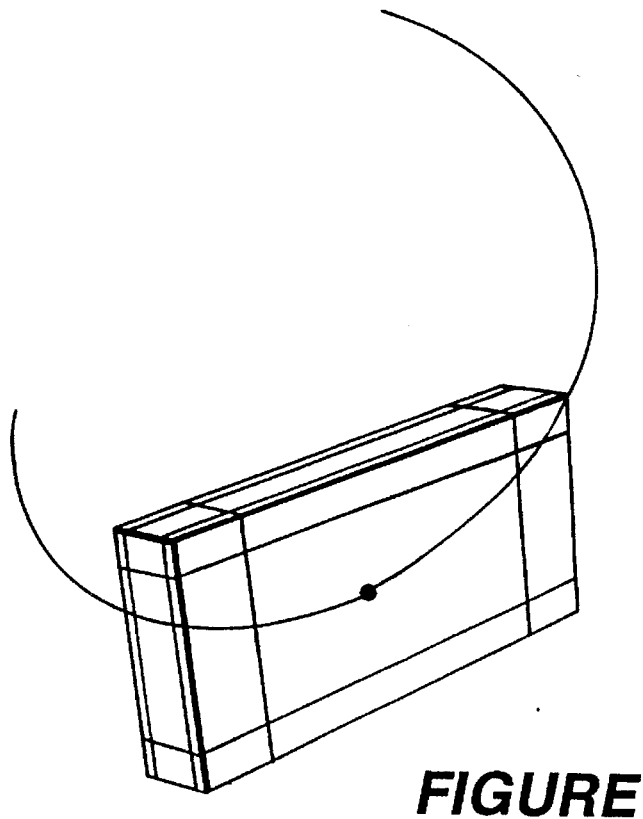
FIG. 12 illustrates a 3D curve that has been selected to enter a shape modification mode in accordance with a preferred embodiment.
Figure 13:
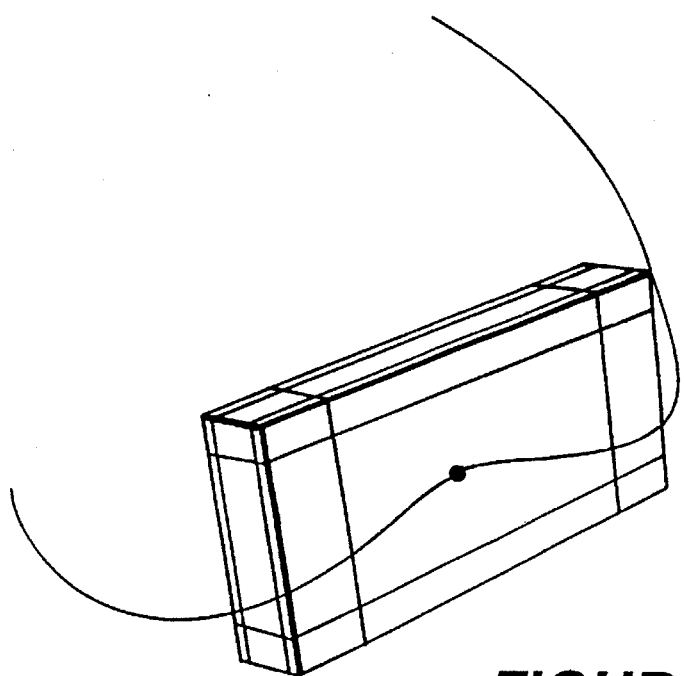
FIG. 13 illustrates the effect of movements of the virtual box on the curve in accordance with a preferred embodiment.
Figure 14:
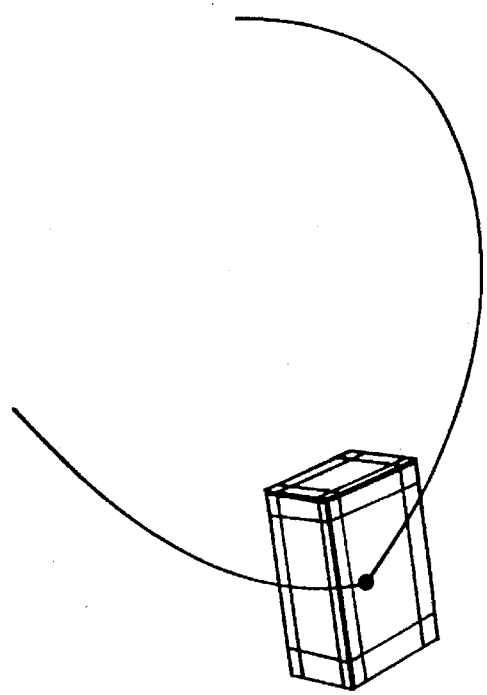
FIG. 14 illustrates scaling a virtual box in accordance with a preferred embodiment.
Figure 15:
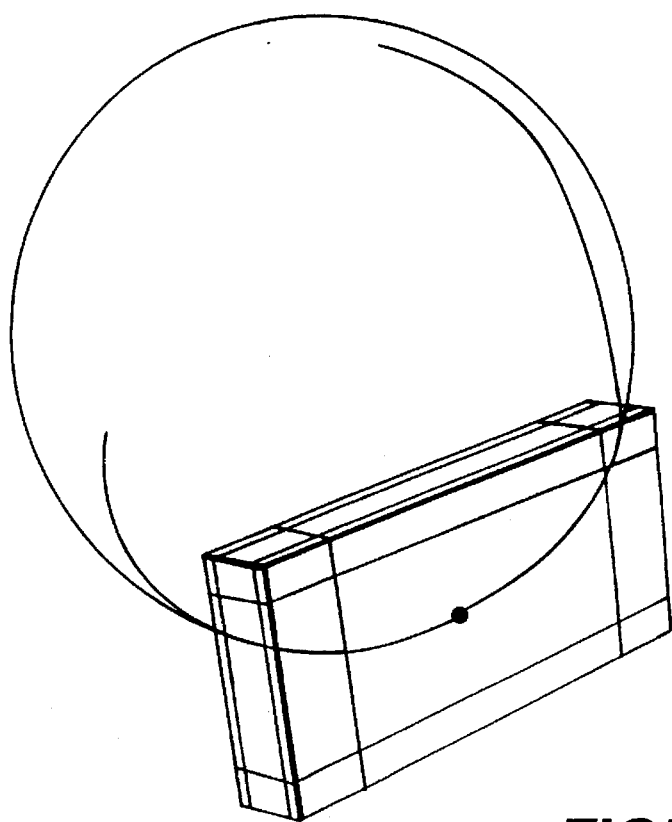
FIG. 15 illustrates a curve that has been locally flattened by scaling the virtual box in accordance with a preferred embodiment.
Figure 16:
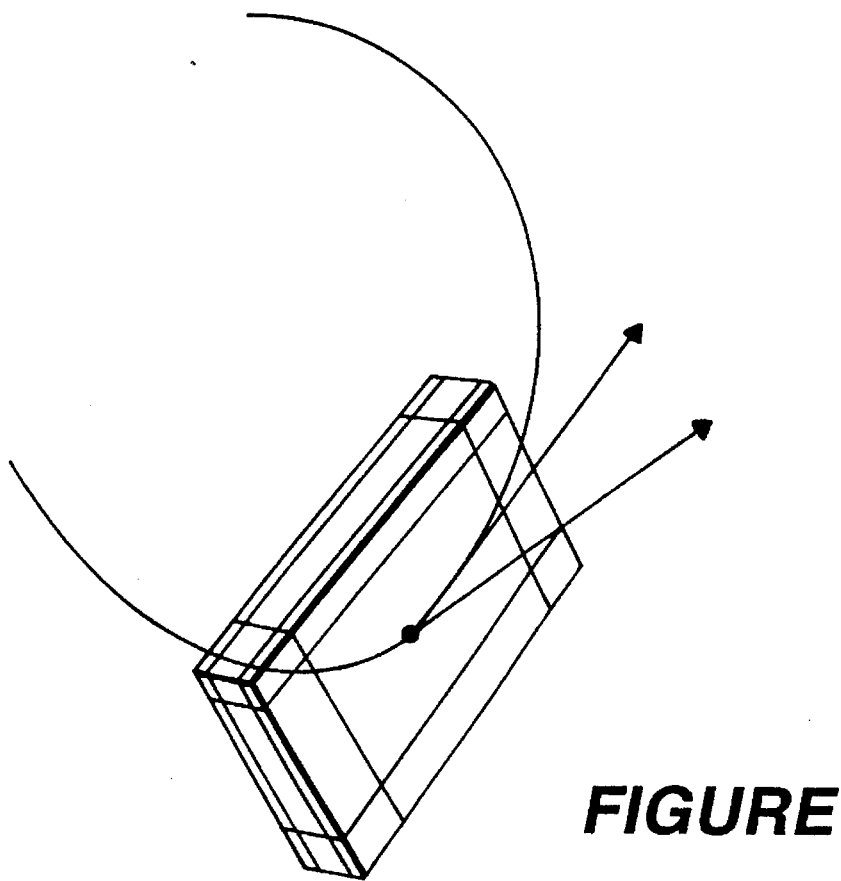
FIG. 16 illustrates the results of rotating the virtual box on the curve in accordance with a preferred embodiment.
Figure 17:
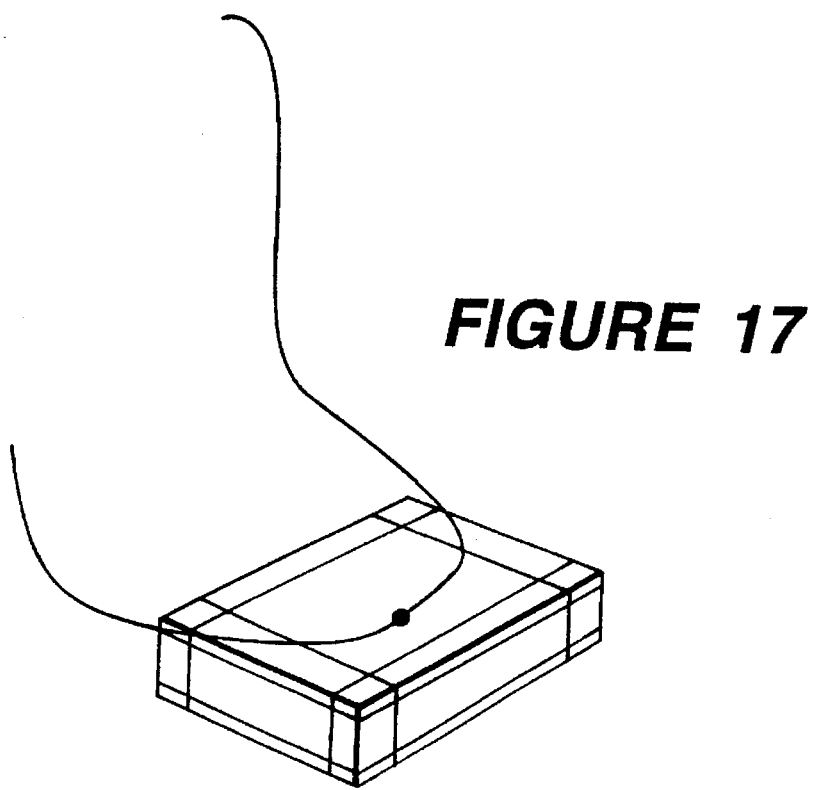
FIG. 17 illustrates the effect of rotating the virtual box in the two non-osculating planes of rotation in accordance with a preferred embodiment.

FIG. 12 illustrates a 3D curve that has been selected to enter a shape modification mode. A virtual box appears around the point where the curve has been selected at as represented by the dot on the display centered in the virtual box. FIG. 13 illustrates the effect of movements of the virtual box on the curve in accordance with a preferred embodiment. The usual movements of the virtual box cause the point on the curve to move along, modifying the curve's shape locally. Movement is predictable due to the virtual box controller. FIG. 14 illustrates scaling a virtual box in accordance with a preferred embodiment. Scaling the virtual box changes the local curvature. FIG. 15 illustrates a curve that has been locally flattened by scaling the virtual box. FIG. 16 illustrates the results of rotating the virtual box on the curve. The rotation results in a change of the tangent. FIG. 17 illustrates the effect of rotating the virtual box in the two non-osculating planes of rotation. The rotation results in a rotation of the osculating plane and a resulting modification of the curve's shape as illustrated in FIG. 17.

"Drag-the-dot" Interaction

Figure 18:
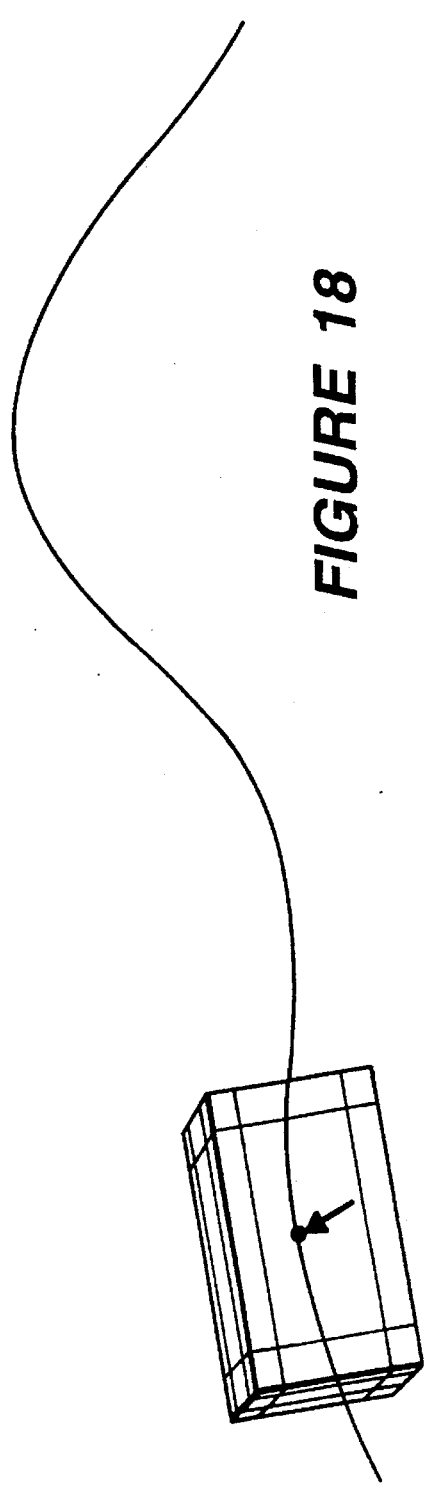
FIG. 18 illustrates a virtual box appearing on a curve, ready for shape manipulation in accordance with a preferred embodiment.
Figure 19:
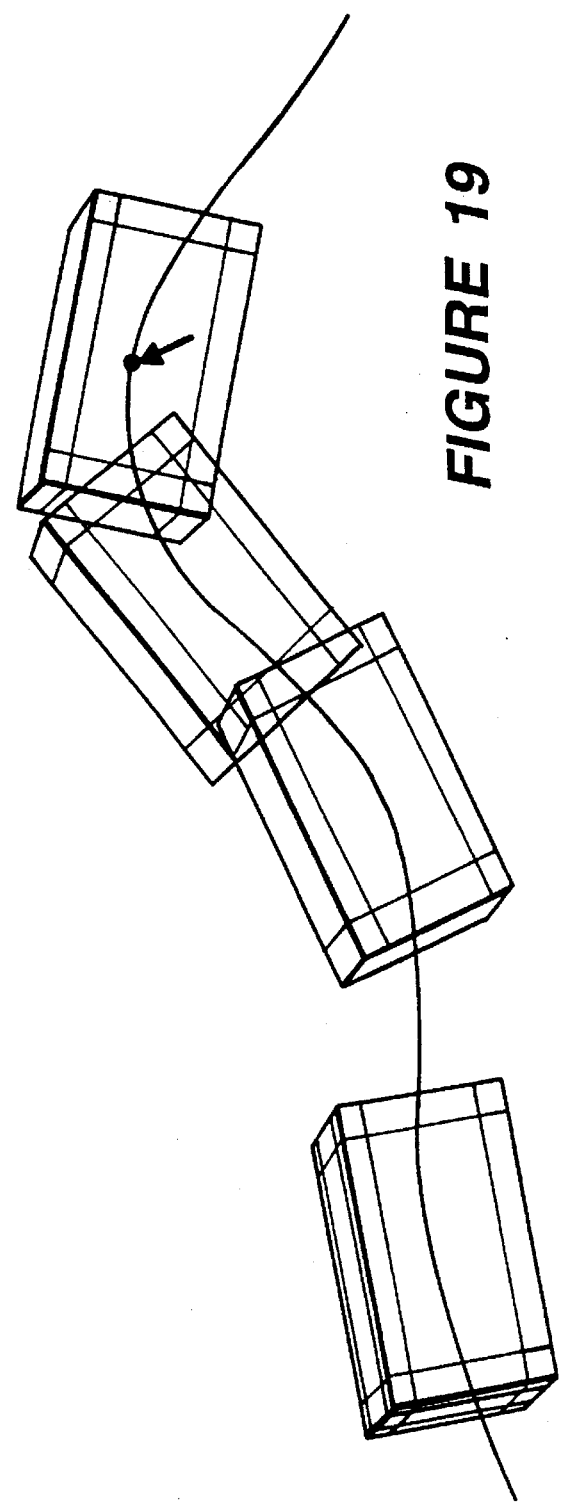
FIG. 19 illustrates a virtual box tracking along a curve's path in accordance with a preferred embodiment.

In the previous examples, a black dot appeared on the curve where the virtual box was centered. This dot can be used to move the virtual box along the curve to allow shape modification in a different part of the curve. FIG. 18 illustrates a moving virtual box curve modification in accordance with a preferred embodiment. In FIG. 18, the virtual box appears on the curve, ready for shape manipulation. Instead of clicking anywhere on the virtual box, the user clicks on the black dot and drags the cursor along the curve. As illustrated in FIG. 19, the virtual box (and the dot) follow along the curve's path. The box's orientation is adjusted automatically to reflect the 3D curve's tangent direction and osculating plane orientation. Following this "drag-the-dot" interaction, the user can then proceed to manipulate curve shape using the virtual box as described before. (As a shortcut to the drag-the-dot interaction, the user can click on another location on the curve while in curve shape editing mode and the virtual box will jump to that place on the curve (i.e. dragging all the way is not necessary)).

Using The Virtual Box For Direct Manipulation Of Curved 3D Surfaces

Figure 20:
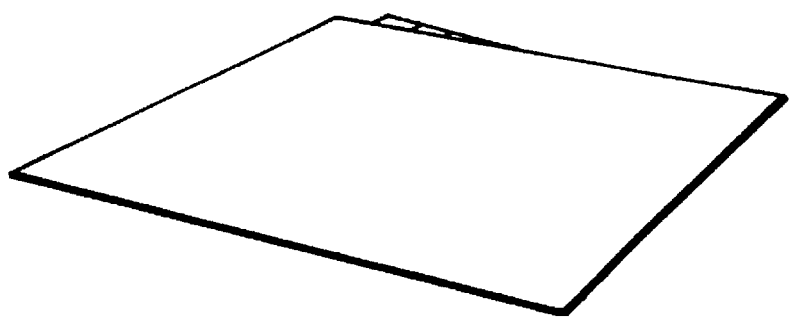
FIG. 20 illustrates a virtual box appearing centered on the spot on the surface that was selected in accordance with a preferred embodiment.
Figure 21:
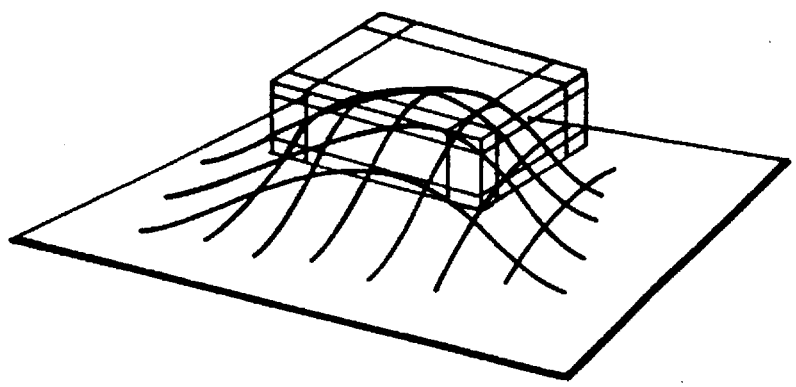
FIG. 21 illustrates a virtual box moved straight up, causing a corresponding deflection in the surface in the direction and orientation of the movement of the virtual box in accordance with a preferred embodiment.
Figure 22:
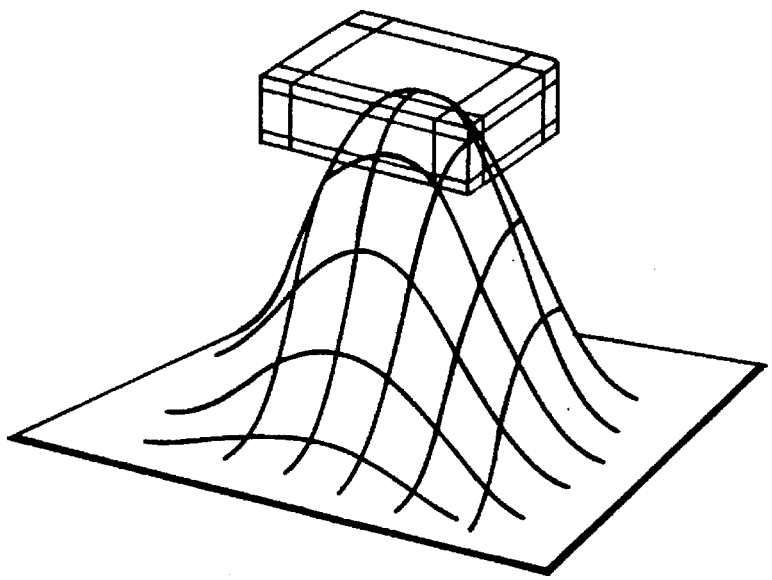
FIG. 22 illustrates a virtual box moved straight up some more causing a corresponding deflection in the surface in the direction and orientation of the movement of the virtual box in accordance with a preferred embodiment.
Figure 23:
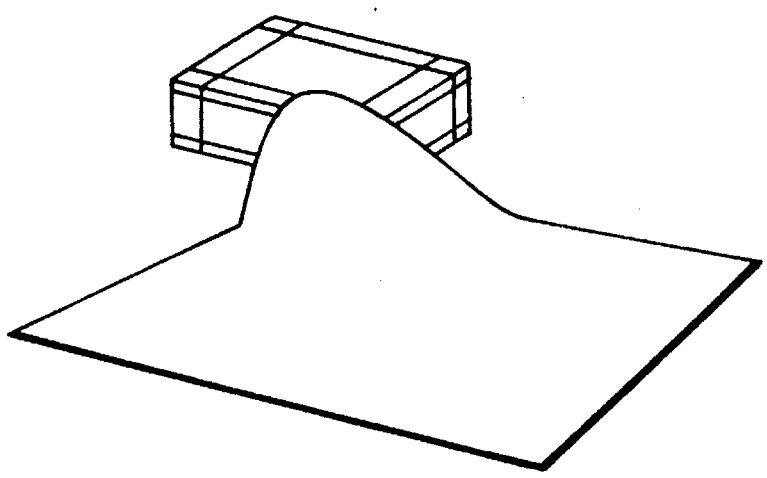
FIG. 23 illustrates a virtual box moved aside and up causing a corresponding deflection in the surface in the direction and orientation of the movement of the virtual box in accordance with a preferred embodiment.
Figure 24:
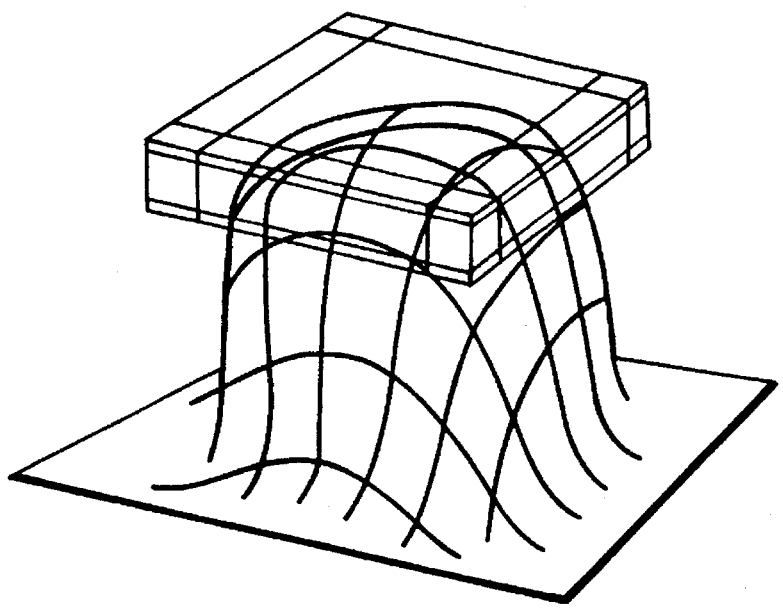
FIG. 24 illustrates a virtual box scaled up uniformly, flattening the surface at the top and causing a corresponding deflection in the surface in the direction and orientation of the movement of the virtual box in accordance with a preferred embodiment.
Figure 25:
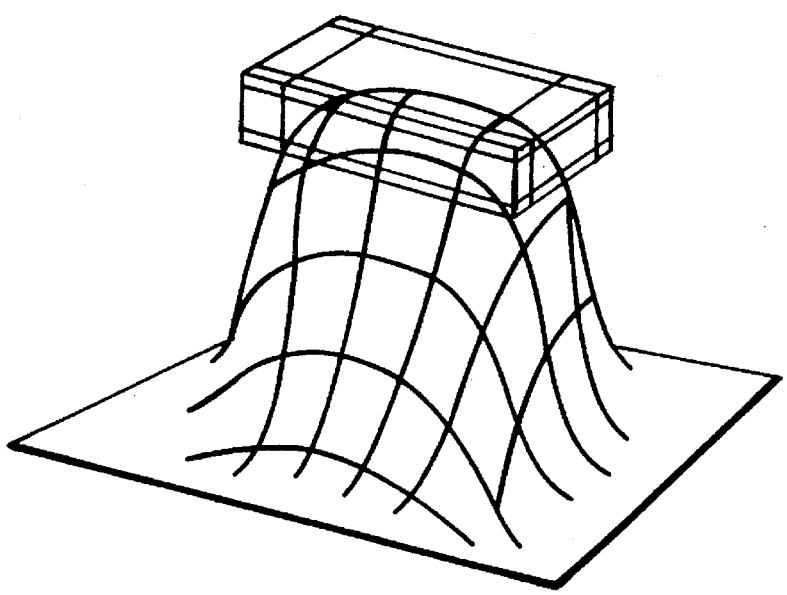
FIG. 25 illustrates a virtual box scaled up non-uniformly, flattening the surface in one parametric direction, but not another causing a corresponding deflection in the surface in the direction and orientation of the movement of the virtual box in accordance with a preferred embodiment.
Figure 26:
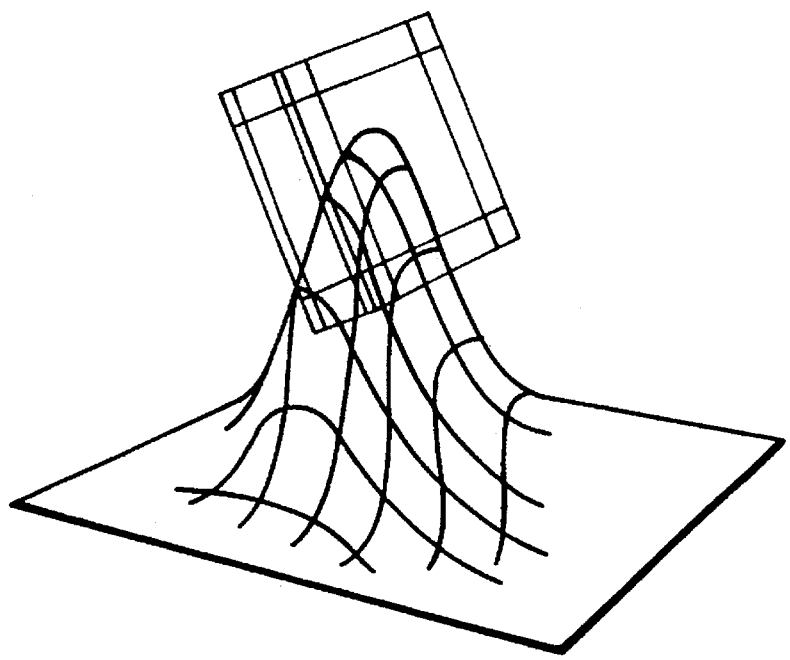
FIG. 26 illustrates a virtual box tilted, slanting the surface locally changing the surfaces tangent plane at the selected surface point and causing a corresponding deflection in the surface in the direction and orientation of the movement of the virtual box in accordance with a preferred embodiment.
Figure 27:
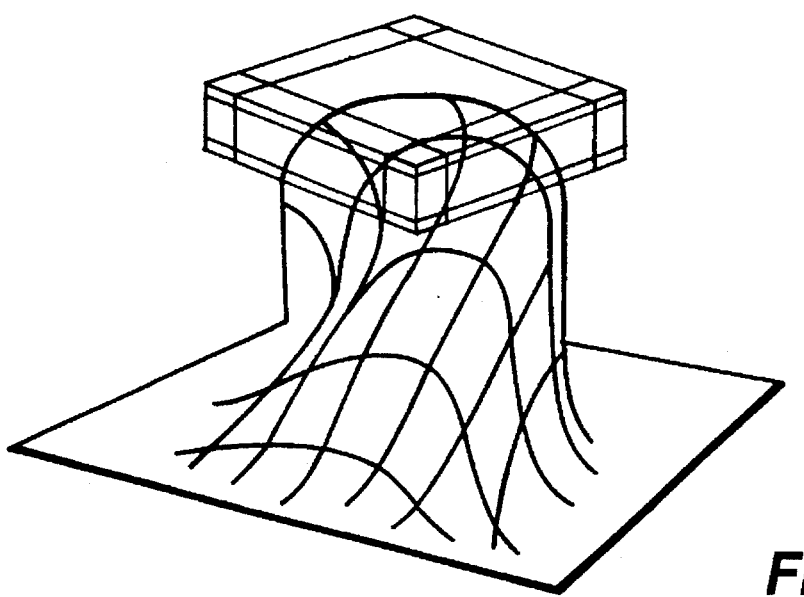
FIG. 27 illustrates a virtual box rotated, causing a corresponding twisting of the surface in the direction and orientation of the movement of the virtual box in accordance with a preferred embodiment.

A few examples to demonstrate the function of a virtual box in a 3D surface direct manipulation interface are presented below. First, the user clicks somewhere on the surface and enters a "shape manipulation mode" (rather than just selecting the surface, which would allow manipulation of the rigid surface as a whole). FIG. 20 illustrates a virtual box appearing centered on the spot on the surface that was selected in accordance with a preferred embodiment. FIG. 21 illustrates a virtual box moved straight up, causing a corresponding deflection in the surface in the direction and orientation of the movement of the virtual box in accordance with a preferred embodiment. FIG. 22 illustrates a virtual box moved straight up some more causing a corresponding deflection in the surface in the direction and orientation of the movement of the virtual box in accordance with a preferred embodiment. FIG. 23 illustrates a virtual box moved aside and up causing a corresponding deflection in the surface in the direction and orientation of the movement of the virtual box in accordance with a preferred embodiment. FIG. 24 illustrates a virtual box scaled up uniformly, flattening the surface at the top and causing a corresponding deflection in the surface in the direction and orientation of the movement of the virtual box in accordance with a preferred embodiment. FIG. 25 illustrates a virtual box scaled up non-uniformly, flattening the surface in one parametric direction, but not another causing a corresponding deflection in the surface in the direction and orientation of the movement of the virtual box in accordance with a preferred embodiment. FIG. 26 illustrates a virtual box tilted, slanting the surface locally changing the surfaces tangent plane at the selected surface point and causing a corresponding deflection in-the surface in the direction and orientation of the movement of the virtual box in accordance with a preferred embodiment. FIG. 27 illustrates a virtual box rotated, causing a corresponding twisting of the surface in the direction and orientation of the movement of the virtual box in accordance with a preferred embodiment.

Using The Virtual Box To Manipulate Parameters Of A Sweep

Figure 28:
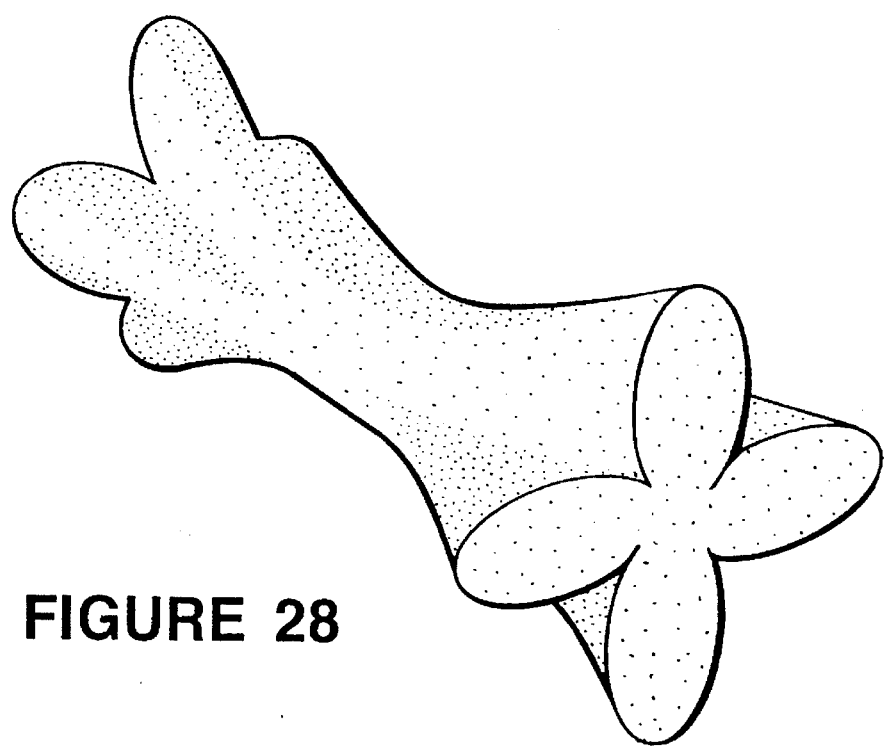
FIG. 28 is an illustration of a sweep object representative of a piece of a whale intestine in accordance with a preferred embodiment.
Figure 29:
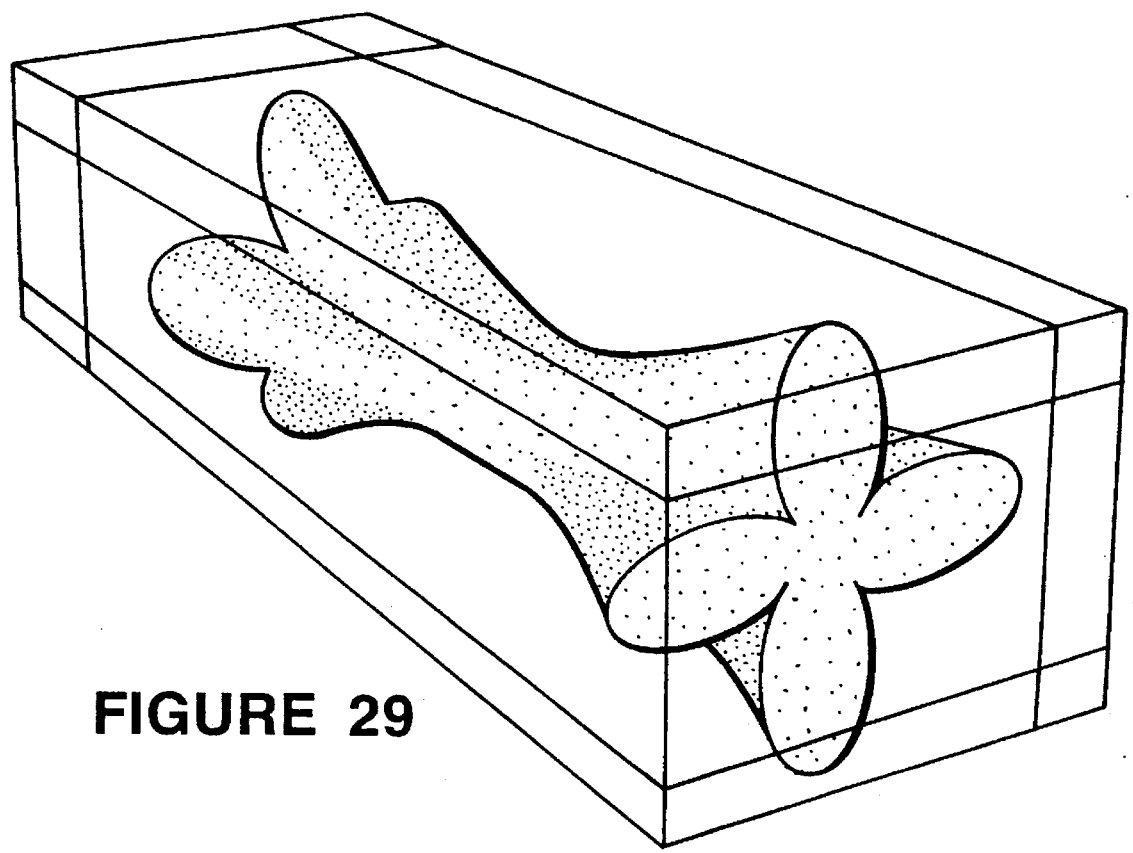
FIG. 29 illustrates the virtual box encompassing a sweep object in accordance with a preferred embodiment.

A virtual box controller can also be used to manipulate the parameters of a sweep. A sweep is a graphical object that is moved through a 2D space to create a 3D representation of a solid object. FIG. 28 is an illustration of a sweep object representative of a piece of a whale intestine in accordance with a preferred embodiment. If the sweep object is selected, then a virtual box provides selection feedback and direct (but rigid) manipulation of the sweep surface. FIG. 29 illustrates the virtual box encompassing a sweep object in accordance with a preferred embodiment. A menu command (like pressing the Edit cmd-E keys) invokes a parameter editing mode. The surface disappears and the input parameters to the sweep surface appear in wireframe rendering.

Figure 30:
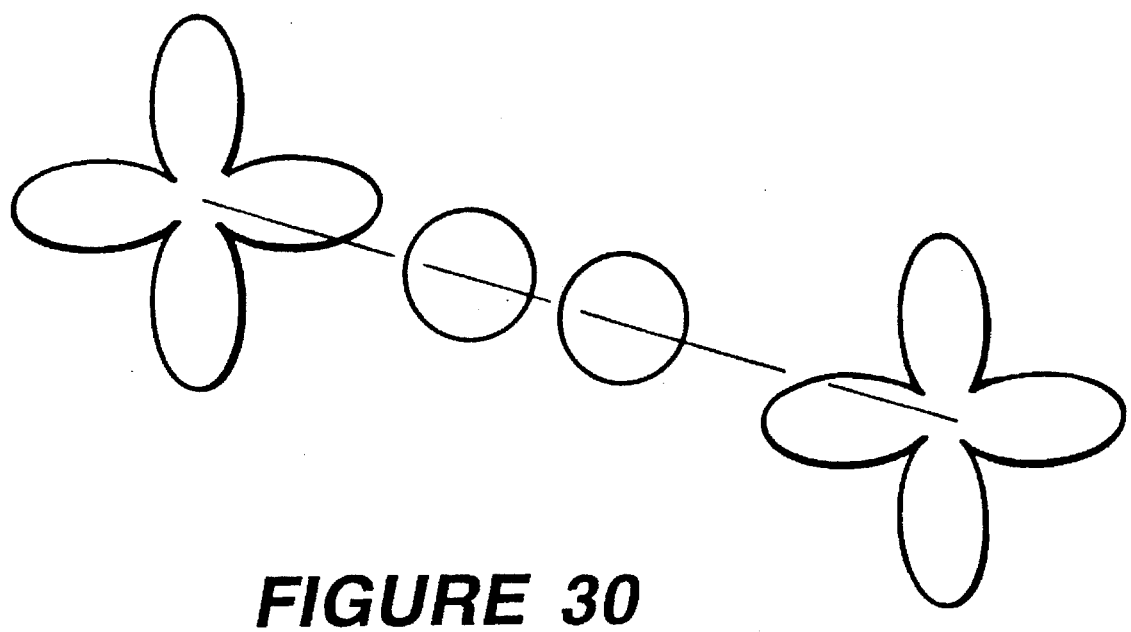
FIG. 30 illustrates the wireframe rendering of the sweep object in accordance with a preferred embodiment.
Figure 31:
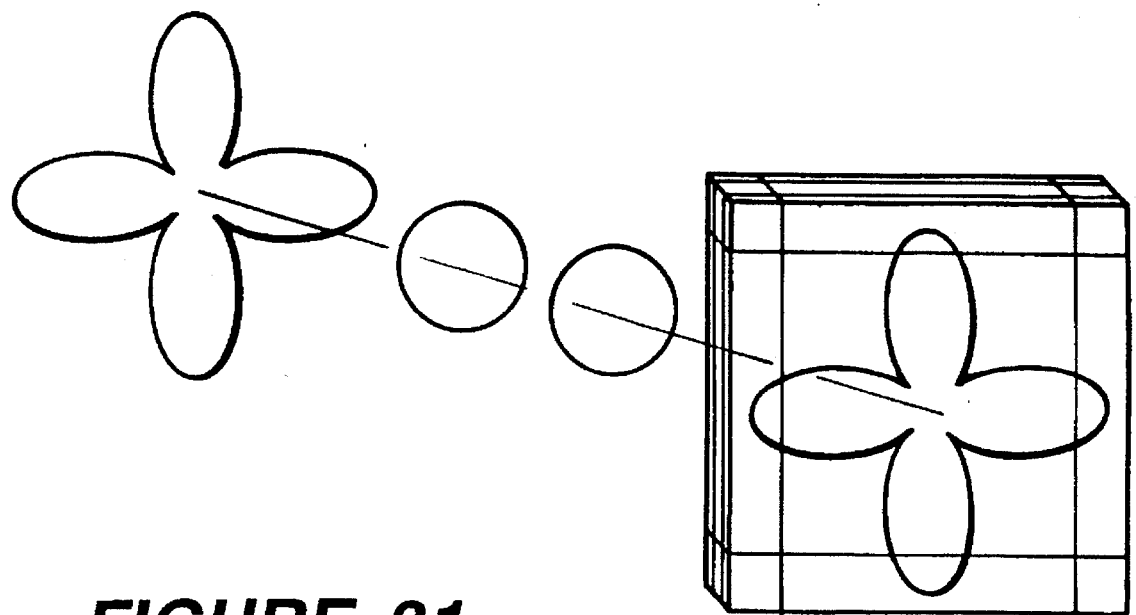
FIG. 31 illustrates the virtual box enclosing the contour in accordance with a preferred embodiment.

FIG. 30 illustrates the wireframe rendering of the sweep object in accordance with a preferred embodiment. The four contours that are interpolated in this sweep, as well as the straight trajectory are now visible. If a user selects the first contour by positioning the mouse pointer over the first contour and pressing the mouse button, a virtual box is positioned around the contour. FIG. 31 illustrates the virtual box enclosing the contour in accordance with a preferred embodiment.

Figure 32:
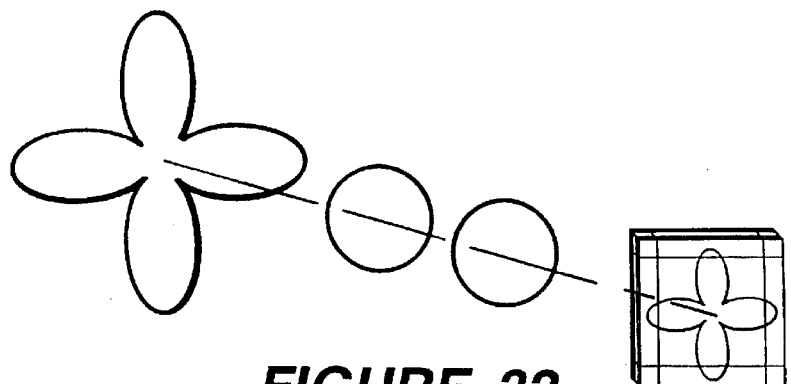
FIG. 32 illustrates a shrink operation on the contour in accordance with a preferred embodiment.
Figure 33:
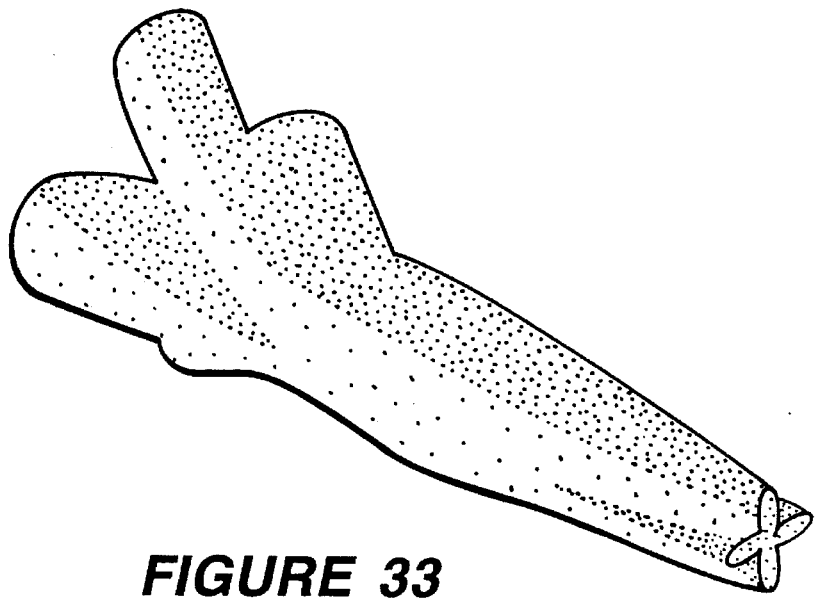
FIG. 33 illustrates a sweep object with the modifications (shrinking) made to the wireframe in accordance with a preferred embodiment.

The contour can now be scaled, rotated or otherwise manipulated as discussed above using the familiar virtual box controls. FIG. 32 illustrates a shrink operation on the contour in accordance with a preferred embodiment. Clicking elsewhere in the scene or pressing cmd-E again to exit the parameter editing mode recreates the sweep surface and renders it using shading. Finally, when specific operations have been performed on the wireframe version of the sweep object, the original sweep object can be rendered again resulting in a sweep object reflecting the modifications made to the wireframe object. FIG. 33 illustrates a sweep object with the modifications (shrinking) made to the wireframe in accordance with a preferred embodiment. The contour could also have been rotated within its plane or rotated out of its original plane. One could also allow contour shape editing using the interactions for 3D curve manipulation described earlier. It is possible to select a different contour for editing by just positioning the mouse pointer over the contour and clicking the mouse button while it is so positioned. This action will result in a removal of the virtual box on the original contour and show a new virtual box on top of the selected contour. An alternative embodiment would allow contour virtual boxes to be moved along the trajectory interactively to create the sweep object.

Adjusting The Origin And Rotation Axes Of The Virtual Box

Figure 34:
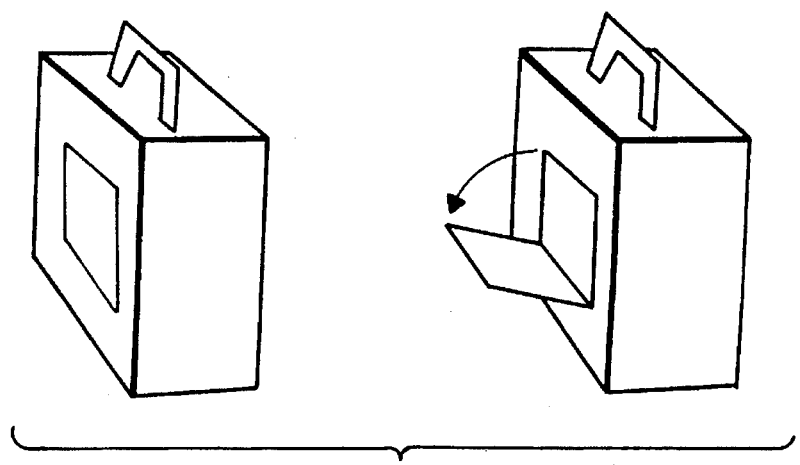
FIG. 34 illustrates a rendering of a tape recorder and the operation of a tape recorder door.
Figure 35:
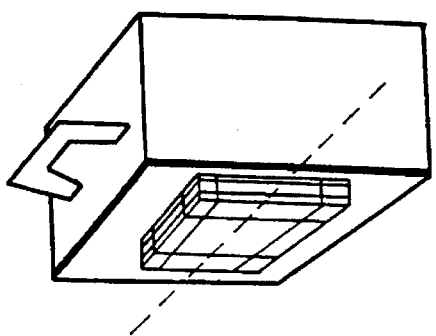
FIG. 35 illustrates the default virtual box on a tape recorder door in accordance with a preferred embodiment.
Figure 36:
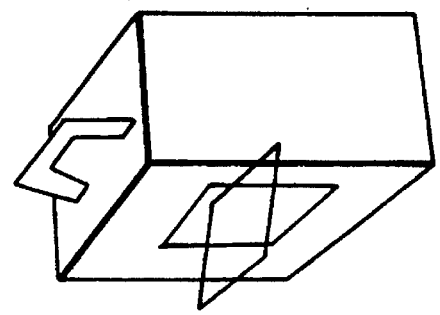
FIG. 36 illustrates the result of rotation for a default virtual box on a tape recorder door.
Figure 37:
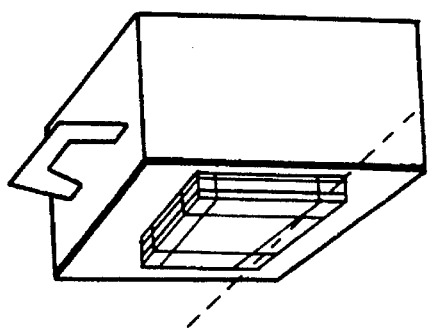
FIG. 37 illustrates a virtual box with an adjusted origin and rotation axis in accordance with a preferred embodiment.
Figure 38:
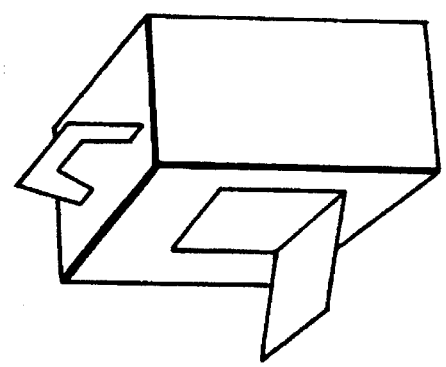
FIG. 38 illustrates a tape recorder door that is rotated around an adjusted axis in accordance with a preferred embodiment.

A virtual box has an internal coordinate system, and origin. These are used during rotation and scaling operations. Rotations always rotate around the origin, scales are always around the origin also as described in detail above. Sometimes it is convenient or more intuitive to move the origin. FIG. 34 illustrates a rendering of a tape recorder and the operation of a tape recorder door. Opening the tape recorder door is a natural function associated with using a tape recorder. FIG. 35 illustrates the default virtual box on a tape recorder door in accordance with a preferred embodiment. FIG. 36 illustrates the result of rotation for a default virtual box on a tape recorder door. Note that the rotation centered around the rotation axis is not the required interaction. Thus, the rotation axis must be adjusted so that its origin is centered appropriately. FIG. 37 illustrates a virtual box with an adjusted origin and rotation axis in accordance with a preferred embodiment. FIG. 38 illustrates a tape recorder door that is rotated around an axis, but now the axis is in the right place.

Figure 39:
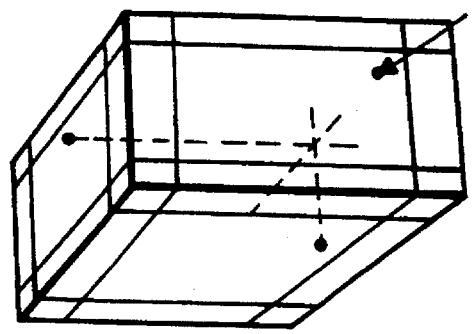
FIG. 39 illustrates the sequence of events associated with modifying the axis in accordance with a preferred embodiment.
Figure 39:
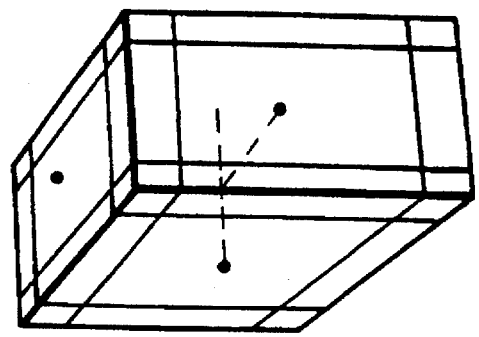
Figure 39:
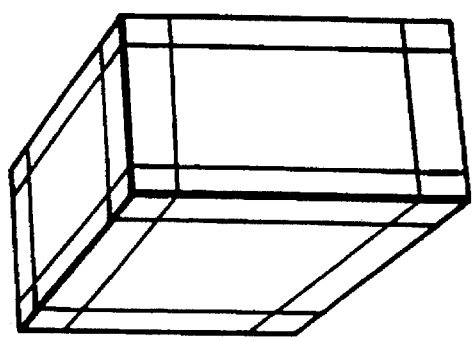

Given that it is sometimes useful to adjust a virtual box origin, a way to interactively do this is provided in a preferred embodiment. For a given virtual box, a menu command (Show axes) is provided to invoke this processing. FIG. 39 illustrates the sequence of events associated with modifying the axis in accordance with a preferred embodiment. At 3900, the virtual box is shown before the modify axis is invoked. Then, at 3910, an illustration of the after axes are shown. Finally, at 3920, a modification of the axis is shown as the axis is dragged by the mouse pointer. This menu command toggles the display of the virtual box's rotation axis. Dots appear on the visible faces where they intersect the axes. These dots can be manipulated by clicking on them and dragging them within their face (a rotation axis should not be dragged outside the virtual box or else user interaction with the box will not be consistent). The movement of the other axis, while dragging a particular one, is automatically coupled so the three axes always intersect in the origin of the virtual box.

While the invention has been described in terms of a preferred embodiment, those skilled in the art will recognize that the invention can be practiced with modification within the spirit and scope of the appended claims.

Having thus described my invention, what I claim as new and desire to secure by Letters Patent is as follows:

1. A method for manipulating a curve object which generates a three-dimensional representation on a display coupled to a computer with a user actuated input controller for selectively positioning a cursor at a location on the display, comprising the steps of:

a) displaying a three-dimensional representation of a virtual box sized and positioned to surround a portion of the three-dimensional representation on the display, the three-dimensional representation extending outside the virtual box, the virtual box having at least one active zone sensitive to the presence of the cursor;

b) detecting the cursor's location over the at least one active zone;

c) activating a control movement type specified by the at least one active zone under the cursor;

d) responding to a reposition of the cursor by controlling the curve object to cause a manipulation of the portion of the three-dimensional representation surrounded by the virtual box; and e) re-displaying the three-dimensional representation in accordance with the manipulation defined in step (d).

2. The method as recited in claim 1, wherein the virtual box is a generally rectangular box which provides a bounding box and includes the step of re-displaying the virtual box enclosing the portion of the three-dimensional representation in accordance with the defined movement of the control movement type.

3. The method as recited in claim 1, including the step of moving the virtual box and causing a corresponding deflection in the portion of the three-dimensional representation surrounded by the virtual box in the direction of the movement of the virtual box.

4. The method as recited in claim 1, wherein the input controller is a mouse.

5. The method as recited in claim 1, wherein the control movement types include rotation, scaling and translation.

6. The method as recited in claim 5, including the steps of translating a plurality of control points of the curve object by determining a difference in model space between the position of the cursor when the translation operation was activated and the current position of the cursor and transforming the difference into scaled and rotated coordinates using a scale transform and a rotate transform and adding the transformed difference to a translation transform to create a new translation transform and wherein re-displaying the curve object on the video display is in accordance with the scale transform, the rotate transform and the new translation transform.

7. The method as recited in claim 5, including the steps of rotating a plurality of control points of the curve object by transforming the position of the cursor when the rotation operation was activated by a scale transform and transforming the current position of the cursor by the scale transform and determining an angle created thereby versus a center point of the curve object and concatenating a rotation matrix of the angle into a rotation transform to create a new rotation transform and wherein re-displaying the curve object on the video display is in accordance with the scale transform, the new rotate transform and the translation transform.

8. The method as recited in claim 5, including the step of scaling a plurality of control points of the curve object parallel to the plane of the face of the virtual box.

9. The method as recited in claim 5, including the step of scaling a plurality of control points of the curve object by determining a ratio of the position of the cursor versus a center point of the curve object when the scaling operation was activated and the current position of the cursor in relation to a center of the curve object.

10. The method as recited in claim 1, including the step of activating the control movement mode by pressing a button on the mouse.

11. The method as recited in claim 1, wherein the virtual box is a geometric figure with active regions corresponding to the geometric figure.

12. The method as recited in claim 1, including the step of changing the shape of the cursor when the computer has been signaled to activate a control movement type to indicate the type and direction of available curve object manipulations.

13. The method as recited in claim 1, wherein the sensitive portion of the virtual box is an image of a hand.

14. The method of claim 1 wherein the virtual box has a user-modifiable axis associated therewith and wherein the method includes the steps of:

o) modifying the user-modifiable axis of the virtual box; and p) controlling the curve object to manipulate the three-dimensional representation in relation to the user-modified axis.

15. A method for manipulating a curve object which generates a three-dimensional representation on a display coupled to a computer with a user actuated input controller for selectively positioning a cursor on the display, comprising the steps of:

a) displaying a three-dimensional representation of a virtual box sized and positioned to surround a portion of the three-dimensional representation on the display, the three-dimensional representation extending outside the virtual box, the virtual box having at least one active zone sensitive to the presence of the cursor;

b) displaying a dot on the three-dimensional representation where the virtual box is centered;

c) detecting the cursor's location over the dot; and d) responding to a repositioning of the cursor to effectuate a movement of the dot and the virtual box along the three-dimensional representation.

16. A method as recited in claim 15, wherein the three-dimensional representation is a curve having a tangent and the method includes the steps of:

(e) adjusting the virtual box orientation in relation to tangent; and (f) adjusting the osculating plane orientation of the three-dimensional representation.

17. A method as recited in claim 15, including the steps of:
moving the cursor to a new location on the curve object;
pressing the mouse button; and
relocating the dot and the virtual box to the new location on the curve object.

18. A method as recited in claim 15, including the steps of:
detecting a cursor's location over at least one active zone;
activating a control movement type specified by the active zone under the cursor;
responding to a repositioning of the cursor to effectuate a manipulation of the curve object; and
re-displaying the curve object in accordance with the defined manipulation of the curve object.

19. An apparatus for manipulating a curve object which generates a three-dimensional representation on a display coupled to a computer with a user actuated input controller for selectively positioning a cursor on the display, comprising:

a) means for displaying a three-dimensional representation of a virtual box sized and positioned to surround a portion of the three-dimensional representation on the display, the three-dimensional representation extending outside the virtual box, the virtual box having at least one active zone sensitive to the presence of the cursor;

b) means for detecting the cursor's location over a least one active zone;

c) means for activating a control movement type specified by the at least one active zone under the cursor;

d) means for responding to a repositioning of the cursor by controlling the curve object to cause a manipulation of the portion of the three-dimensional representation surrounded by the virtual box; and e) means for re-displaying the three-dimensional representation in accordance with the manipulation defined in step (d).

20. The apparatus as recited in claim 19, wherein the virtual box is a generally rectangular box which provides a bounding box and includes means for re-displaying the virtual box enclosing the portion of the three-dimensional representation in accordance with the defined movement of the control movement of the control movement type.

21. The apparatus as recited in claim 19, including means for moving the virtual box and causing a corresponding deflection in the portion of the three-dimensional representation enclosed by the virtual box in the direction of the movement of the virtual box.

22. The apparatus as recited in claim 18, wherein the input controller is a mouse.

23. The apparatus as recited in claim 19, wherein the control movement types include rotation, scaling and translation.

24. The apparatus as recited in claim 23, including means for translating a plurality of control points of the curve object by determining a difference in model space between the position of the cursor when the translation operation was activated and the current position of the cursor and transforming the difference into scaled and rotated coordinates using a scale transform and a rotate transform and adding the transformed difference to a translation transform to create a new translation transform and wherein re-displaying the curve object on the video display is in accordance with the scale transform, the rotate transform and the new translation transform.

25. The apparatus as recited in claim 23, including means for rotating a plurality of control points of the curve object by transforming the position of the cursor when the rotation operation was activated by a scale transform and transforming the current position of the cursor by the scale transform and determining an angle created thereby versus a center point of the curve object and concatenating a rotation matrix of the angle into a rotation transform to create a new rotation transform and wherein the means for re-displaying the curve object on the video display is in accordance with the scale transform, the new rotate transform and the translation transform.

26. The apparatus as recited in claim 23, including means for scaling a plurality of control points of the curve object parallel to the plane of the face of the virtual box.

27. The apparatus as recited in claim 23, including means for scaling a plurality of control points of the curve object by determining a ratio of the position of the cursor versus a center point of the curve object when the scaling operation areas activated and the current position of the cursor in relation to a center of the curve object.

28. The apparatus as recited in claim 19, including means for activating the control movement mode by pressing a button on the mouse.

29. The apparatus as recited in claim 19, wherein the virtual box is a geometric figure with active regions corresponding to the geometric figure.

30. The apparatus as recited in claim 19, including means for changing the shape of the cursor when the computer has been signaled to activate a control movement type to indicate the type and direction of available curve object manipulations.

31. The apparatus as recited in claim 19, wherein the sensitive portion of the virtual box is an image of a hand.

32. The apparatus of claim 19 wherein the virtual box has a user-modifiable axis associated therewith and wherein the responding means includes means responsive to the repositioning of the cursor for controlling the curve object to manipulate the three-dimensional representation in relation to the user-modifiable axis.

33. An apparatus for manipulating curve object which generates a three-dimensional representation on a display coupled to a computer with a user actuated input controller for selectively positioning a cursor on the display, comprising:

a) means for displaying a three-dimensional representation of a virtual box sized and positioned to surround a portion of the three-dimensional representation on the display, the three-dimensional representation extending outside the virtual box, the virtual box having at least one active zone sensitive to the presence of the cursor;

b) means for displaying a dot on the three-dimensional representation where the virtual box is centered;

c) means for detecting a cursor's location over the dot; and d) means for responding to a repositioning of the cursor to effectuate a movement of the dot and the virtual box along the three-dimensional representation.

34. An apparatus as recited in claim 33, including means for adjusting the virtual box orientation in relation to the curve object's tangent and the curve object's osculating plane orientation.

35. An apparatus as recited in claim 34, including:

means for moving the cursor on the display to a new location on the curve object on the display;

means for detecting a signal indicative of relocation; and means for relocating the dot and the virtual box to the new location on the curve object on the display.

36. An apparatus as recited in claim 35, including:

means for detecting a cursor's location over at least one active zone;

activating a control movement type specified by the active zone under the cursor;

means for responding to a repositioning of the cursor to effectuate a manipulation of the curve object; and means for re-displaying the curve object in accordance with the defined manipulation of the curve object.

37. A method for manipulating a curved 3D surface object which generates a three-dimensional representation on a display coupled to a computer with an input controller for selectively positioning a cursor on the display, the method comprising the steps of:

a) displaying a three-dimensional representation of a virtual box sized and positioned to surround a portion of the three-dimensional representation on the display, the three-dimensional representation extending outside of the virtual box, the virtual box having at least one active zone sensitive to the presence of the cursor;

b) detecting the cursor's location over at least one active zone;

c) activating a control movement type specified by the active zone under the cursor;

d) responding to a reposition of the cursor by controlling the curved 3D surface object to manipulate the three-dimensional representation surrounded by the virtual box; and e) re-displaying the three-dimensional representation in accordance with the manipulation defined in step (d).

38. The method of claim 37 wherein the portion of the three-dimensional representation surrounded by the virtual box has a gradient and the method includes the steps of:

f) activating a translate movement type to translate the portion of the three-dimensional representation along the gradient;

g) translating the portion of the three-dimensional representation in accordance with the repositioning of the cursor in step (d); and h) re-displaying the three-dimensional representation to produce a deflection in the portion of the three-dimensional representation along the gradient in accordance with step (g).

39. The method of claim 39 wherein the portion of the three-dimensional representation surrounded by the virtual box has a tangential plane and the method includes the steps of:

i) activating a translate movement type to translate the portion of the three-dimensional representation along the tangential plane;

j) translating the portion of the three-dimensional representation in accordance with the repositioning of the cursor in step (d); and k) re-displaying the three-dimensional representation to produce a deflection in the portion of the three-dimensional representation along the tangential plane in accordance with step (j).

40. The method of claim 37 including the steps of:

l) activating a scale movement type to scale the three-dimensional representation;

m) scaling the three-dimensional representation along parametric directions defined by the virtual box in accordance with the repositioning of the cursor in step (d); and n) re-displaying the three-dimensional representation to produce a three-dimensional representation that is scaled along the parametric directions in accordance with step (m).

41. The method of claim 37 including the steps of:

o) activating a rotate movement type to slant a local portion of the three-dimensional representation, the local portion having a tangent plane;

27 p) slanting the local portion of the three-dimensional representation by changing the tangent plane in accordance with the repositioning of the cursor in step (d); and q) re-displaying the three-dimensional representation to produce a three-dimensional representation that is slanted at the local portion in accordance with step (p).

42. The method of claim 37 wherein the three-dimensional representation has a gradient and the method includes the steps of:

r) activating a rotate movement type to twist a local portion of the three-dimensional representation about the gradient;

s) twisting the local portion of the three-dimensional representation about the gradient in accordance with the repositioning of the cursor in step (d); and t) re-displaying the three-dimensional representation to produce a three-dimensional representation that is twisted about the gradient in accordance with step (s).

43. An apparatus for manipulating a curved 3D surface object which displays a three-dimensional representation on a display coupled to a computer with an input controller for selectively positioning a cursor on the display at a location, comprising:

means for displaying a three-dimensional representation of a virtual box to surround a portion of the three-dimensional representation on the display, the three-dimensional representation extending outside of the virtual box, the virtual box having at least one active zone sensitive to the presence of the cursor;

means for detecting the cursor's location over at least one active zone;

means for activating a control movement type specified by the active zone under the cursor;

means responsive to a reposition of the cursor for controlling the curved 3D surface object to manipulate the portion of the three-dimensional representation surrounded by the virtual box; and means responsive to the manipulation of the three-dimensional representation for re-displaying the manipulated three-dimensional representation.

44. The apparatus of claim 43 wherein the three-dimensional representation has a gradient and wherein the apparatus further includes:

means for activating a translate movement type to translate the portion of the three-dimensional representation along the gradient;

means responsive to the repositioning of the cursor for translating the portion of the three-dimensional representation; and means responsive to the repositioning of the cursor for re-displaying the three-dimensional representation to produce a deflection in the portion of the three-dimensional representation along the gradient.

45. The apparatus of claim 43 wherein the three-dimensional representation has a tangential plane and wherein the apparatus further includes:

means for activating a translate movement type to translate the portion of the three-dimensional representation along the tangential plane;

means responsive to the repositioning of the cursor for translating the portion of the three-dimensional representation; and means responsive to the repositioning of the cursor for re-displaying the three-dimensional representation to produce a deflection in the portion of the three-dimensional representation along the tangential plane.

46. The apparatus of claim 43 further including:

means for activating a scale movement type to scale the three-dimensional representation, means responsive to the repositioning of the cursor for scaling the three-dimensional representation along parametric directions defined by the virtual box; and means responsive to the repositioning of the cursor for re-displaying the three-dimensional representation to produce a three-dimensional representation that is scaled along the parametric directions.

47. The apparatus of claim 43 further including:

means for activating a rotate movement type to slant a local portion of the three-dimensional representation, the local portion having a tangent plane;

means responsive to the repositioning of the cursor for slanting the local portion of the three-dimensional representation by changing the tangent plane; and means responsive to the repositioning of the cursor for re-displaying the three-dimensional representation to produce a three-dimensional representation that is slanted at the local portion.

48. The apparatus of claim 43 wherein the three-dimensional representation has a gradient and wherein the apparatus further includes:

means for activating a rotate movement type to twist a local portion of the three-dimensional representation about the gradient;

means responsive to the repositioning of the cursor for twisting the local portion of the three-dimensional representation about the gradient; and means responsive to the repositioning of the cursor for re-displaying the three-dimensional representation to produce a three-dimensional representation that is twisted about the gradient.

49. A method for manipulating a sweep object having input parameters and generating an image having a surface displayed on a display coupled to a computer with an input controller for selectively positioning a cursor on the display, the method comprising the steps of:

a) displaying a three-dimensional representation of a virtual box proximal to one of the plurality of input parameters of the image on the display, the virtual box having at least one active zone sensitive to the presence of the cursor;

b) detecting the cursor's location over at least one active zone;

c) activating a control movement type specified by the active zone under the cursor;

d) responding to a reposition of the cursor by controlling the sweep object to effectuate a manipulation of the one parameter of the image proximal to the virtual box; and e) re-displaying the image in accordance with the manipulation of the one parameter.

50. The method of claim 49 wherein the one parameter of the sweep object is a contour and wherein step (a) includes the steps of:

(a1) deleting the sweep image surface from the display; and (a2) displaying the plurality of input parameters of the sweep object as a wireframe rendering.

51. The method of claim 49 including the steps of:

f) activating a translate movement type to translate the one input parameter of the sweep object;

g) translating the one input parameter of the sweep object in accordance with the repositioning of the cursor in step (d); and h) re-displaying the sweep object image to produce a sweep object image having a shape modified in accordance with the one input parameter as translated in step (g).

52. The method of claim 49 including the steps of:

i) activating a scale movement type to scale the one input parameter of the sweep object;

j) scaling the one input parameter of the sweep object in accordance with the repositioning of the cursor in step (d); and k) re-displaying the sweep object image to produce a sweep object to image having a shape modified in accordance with the one input parameter as scaled in step (j).

53. The method of claim 49 including the steps of:

l) activating a rotate movement type to rotate the one input parameter of the sweep object;

m) rotating the one input parameter of the sweep object in accordance with the repositioning of the cursor in step (d); and n) re-displaying the sweep object image to produce a sweep object image having a shape modified in accordance with the one input parameter as rotated in step (m).

* * * * *